United States Patent [19]
Rionde

[11] Patent Number: 5,947,266
[45] Date of Patent: Sep. 7, 1999

[54] PROTECTIVE AND INSULATING ENCLOSURE WITH REMOVABLE PANELS FOR A TRANSFER UNIT

[75] Inventor: Guy Rionde, Vittel, France

[73] Assignee: Rionde SA, Vittel, France

[21] Appl. No.: 08/145,536

[22] Filed: Nov. 4, 1993

[51] Int. Cl.⁶ .................................................. B65G 21/08
[52] U.S. Cl. ........................................................ 198/860.3
[58] Field of Search .............................. 198/860.1, 860.3, 198/860.5, 735.3

[56] References Cited

U.S. PATENT DOCUMENTS

| | | | |
|---|---|---|---|
| 966,488 | 8/1910 | Torseth | 198/860.3 |
| 2,837,203 | 6/1958 | Reeser | 198/860.5 |
| 3,878,936 | 4/1975 | Niggemyer | 198/860.5 |
| 4,093,066 | 6/1978 | Mitchell et al. | 198/860.5 |
| 4,387,799 | 6/1983 | Sweeney et al. | 198/860.5 X |

FOREIGN PATENT DOCUMENTS

| | | | |
|---|---|---|---|
| 3622702 | 2/1988 | Germany | 198/860.5 |
| 3823633 | 3/1989 | Germany | 198/860.3 |
| 1608100 | 11/1990 | U.S.S.R. | 198/860.3 |

Primary Examiner—James R. Bidwell
Attorney, Agent, or Firm—Davis and Bujold

[57] ABSTRACT

A protective and insulating enclosure for a transfer unit of the conveyor type, the enclosure formed by lateral sides consisting of panels (2) removably mounted between a bottom carrier profiled section (6) and a (7), the panels are separated laterally by joining profiled sections, a top cover formed by sloping panels (121) with an end housed so as to be encased in a linear cavity (134) in a rear top profiled section (127), a front end of the top panels bearing on the longitudinal top holding profiled section, and the top panels separated by lateral joining sections (128, 129), a bottom enclosure consisting of a central recovery channel (120), between two longitudinal bottom carrier profiled sections (6, 176, 177), the central recovery channel having removable plates (118, 119, 189) sloping towards the central recovery channel enabling all panels to be fitted and removed easily and rapidly without any tool or equipment.

24 Claims, 16 Drawing Sheets

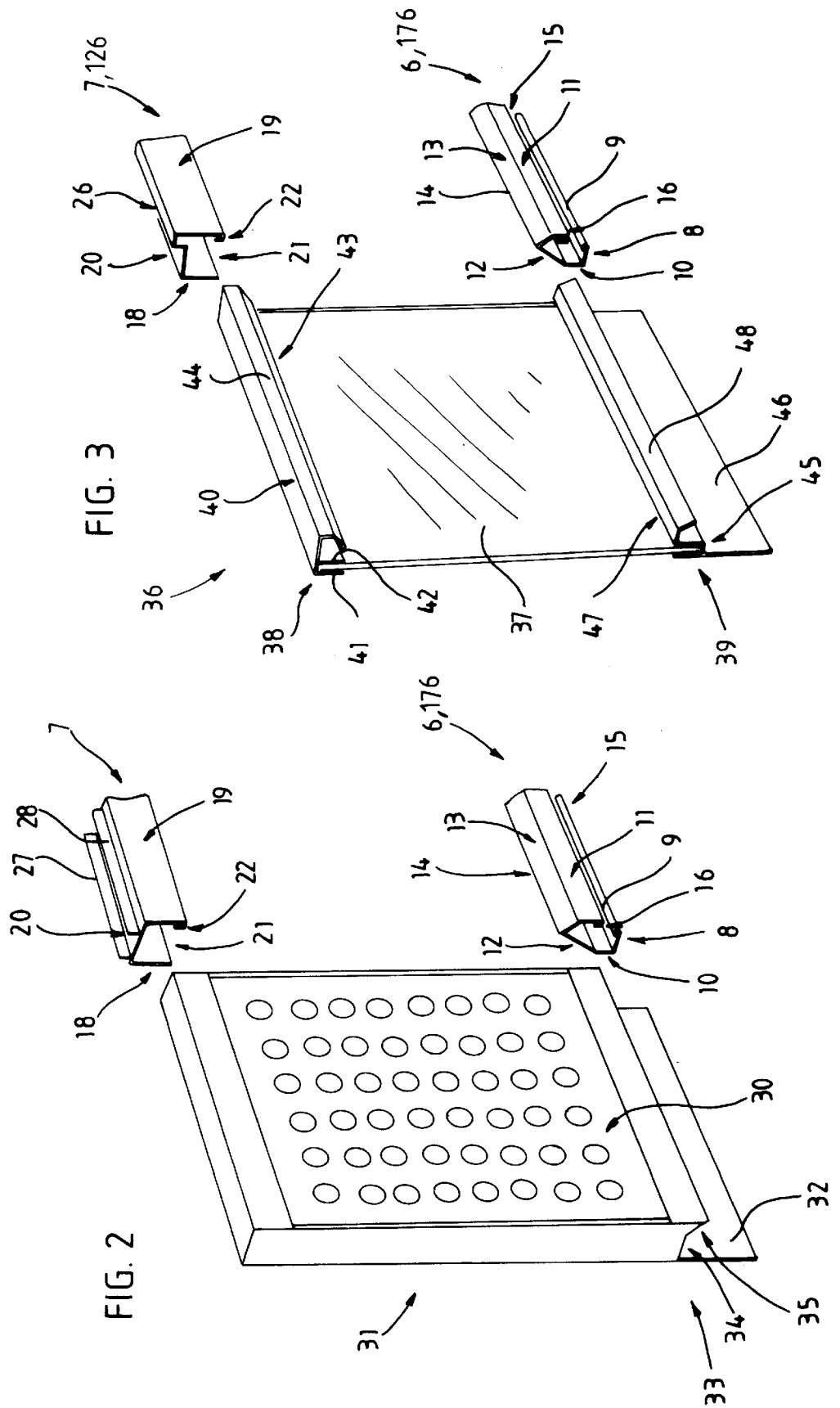

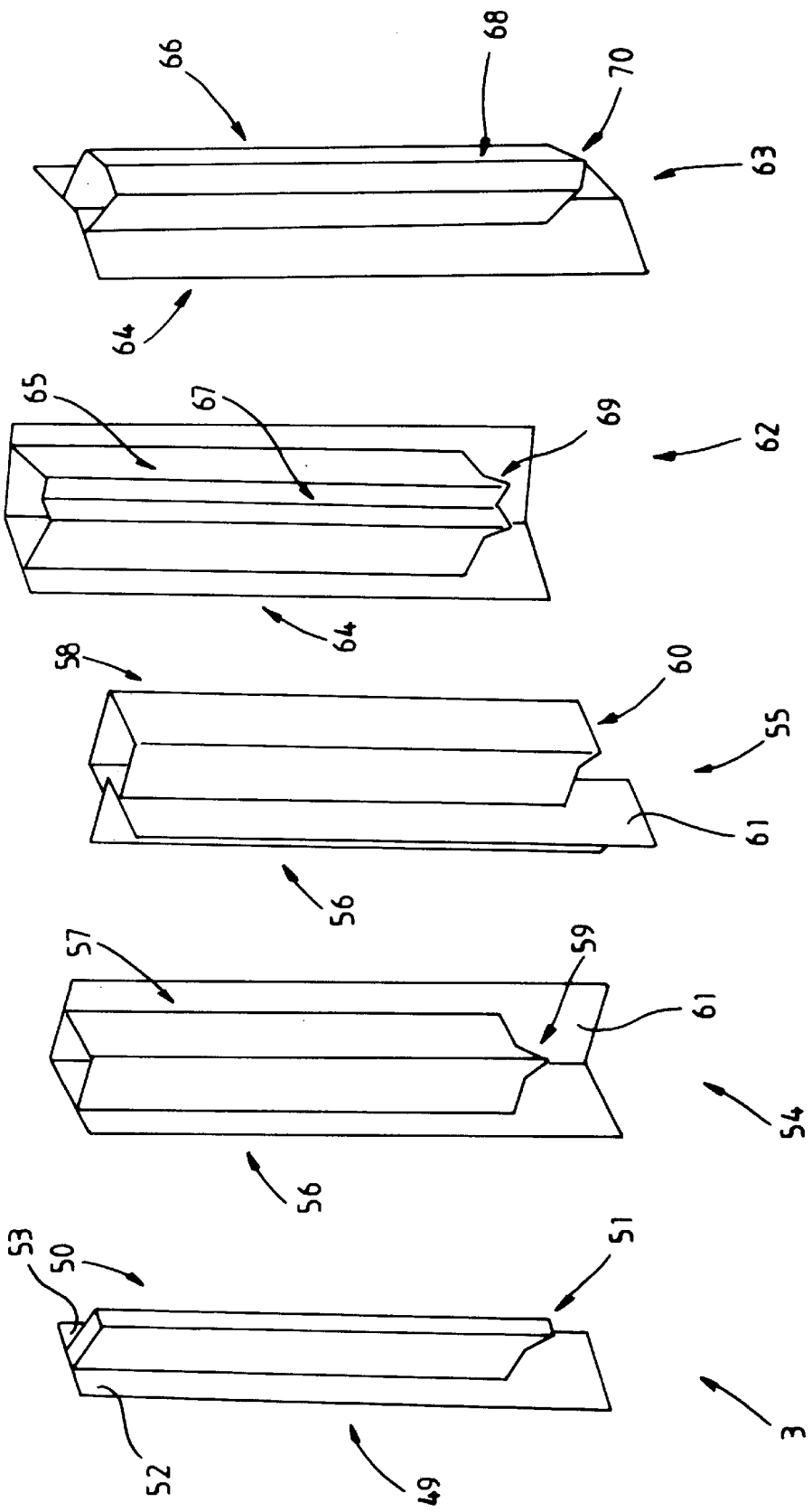

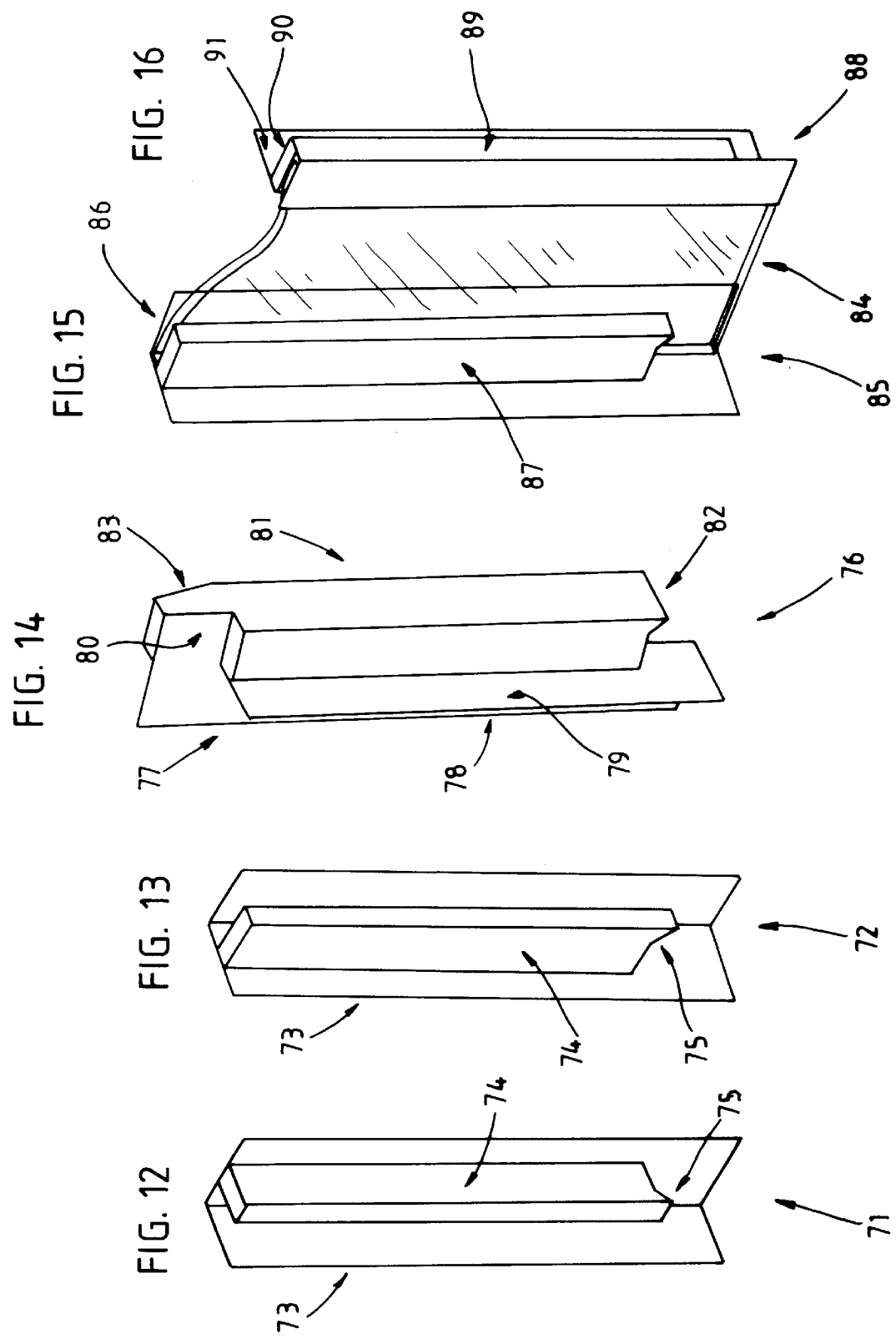

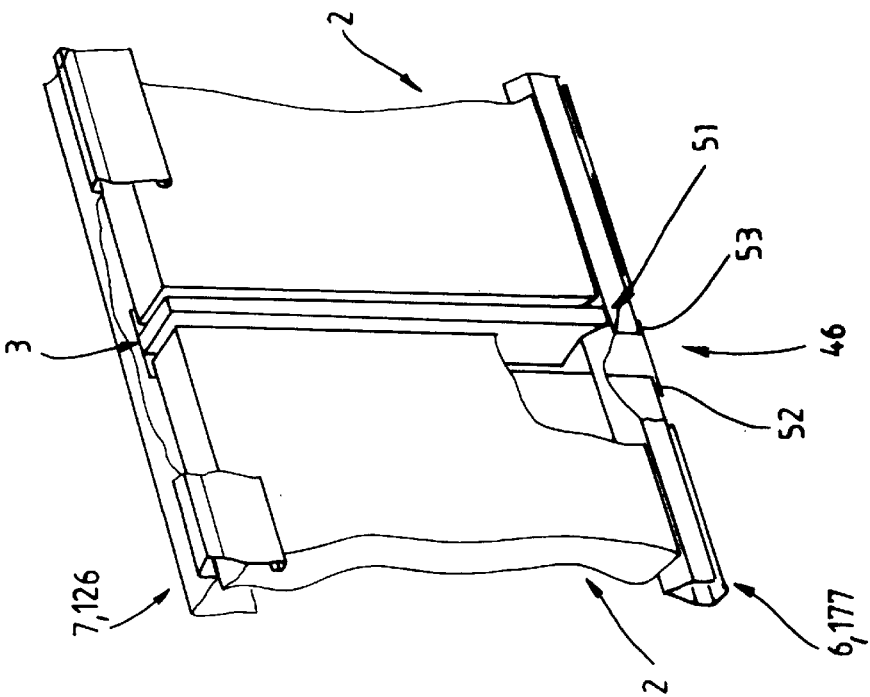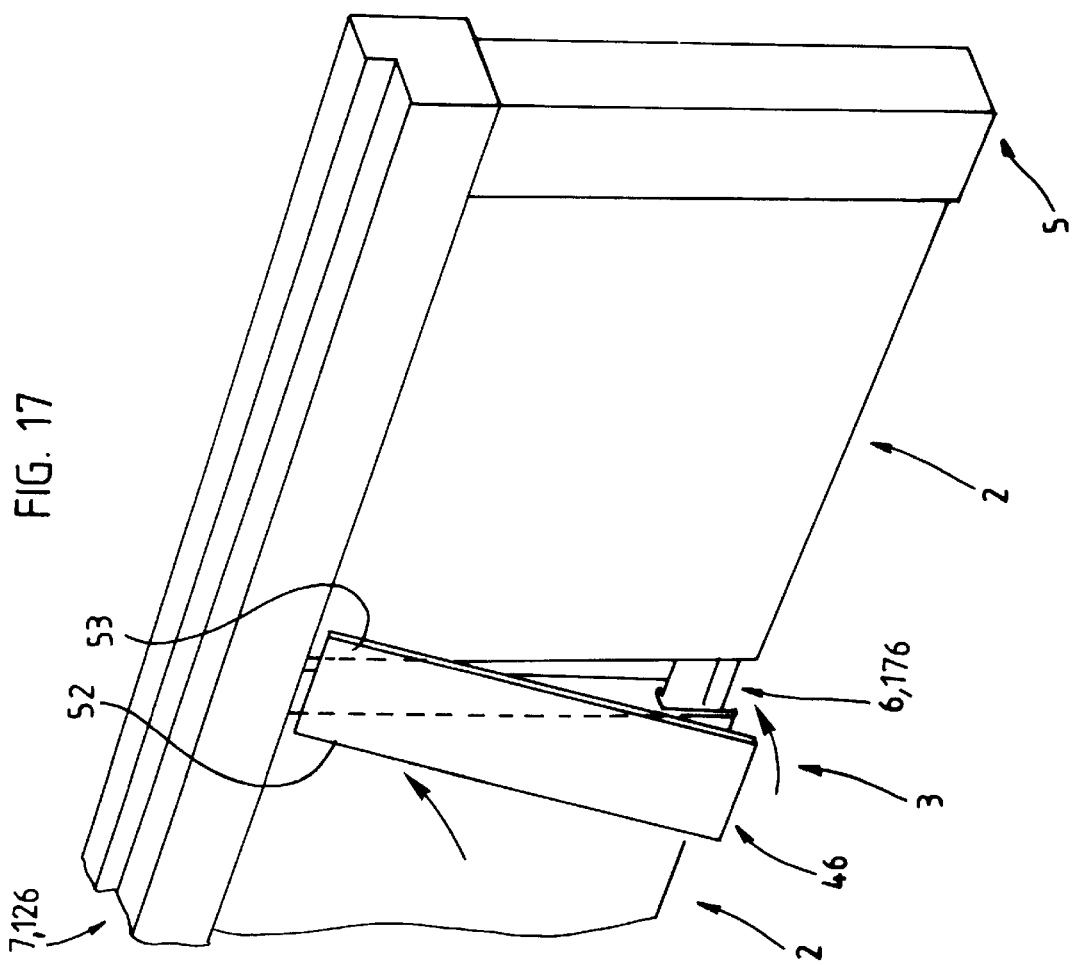

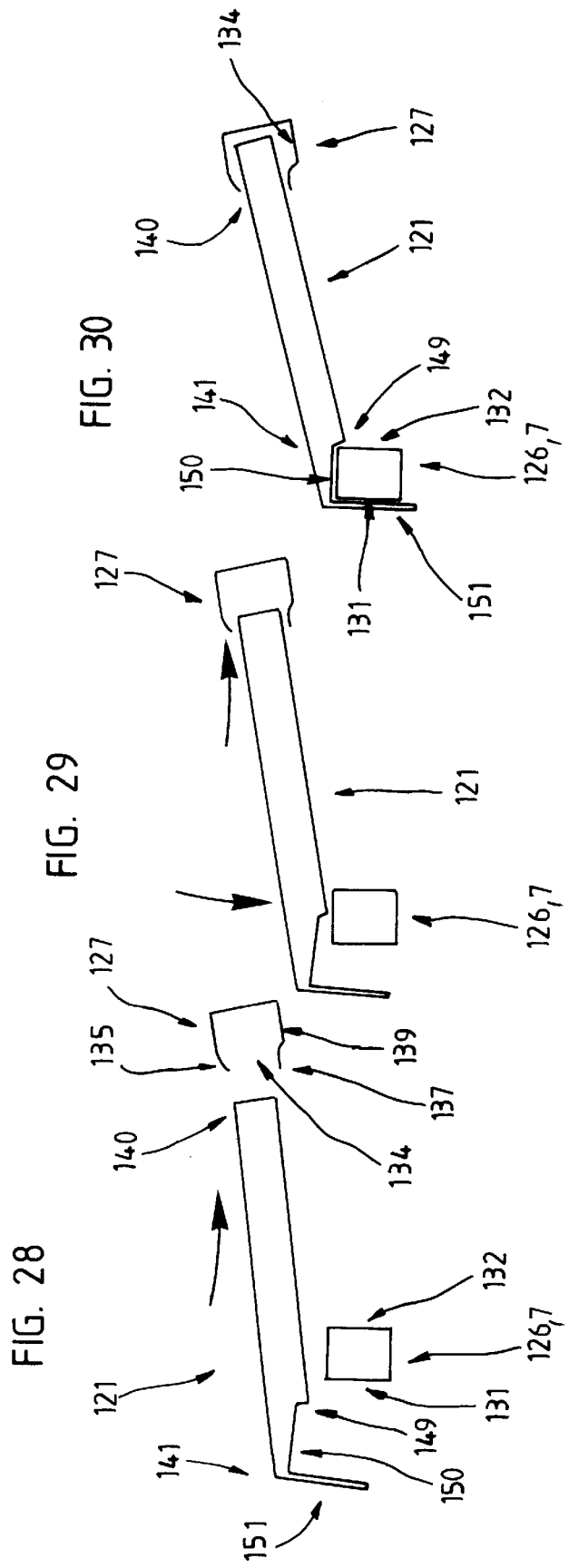

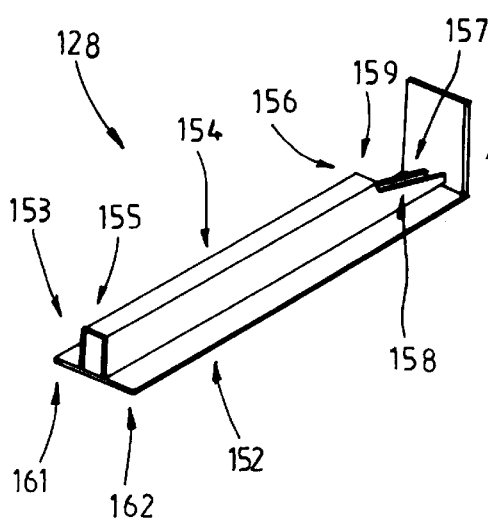
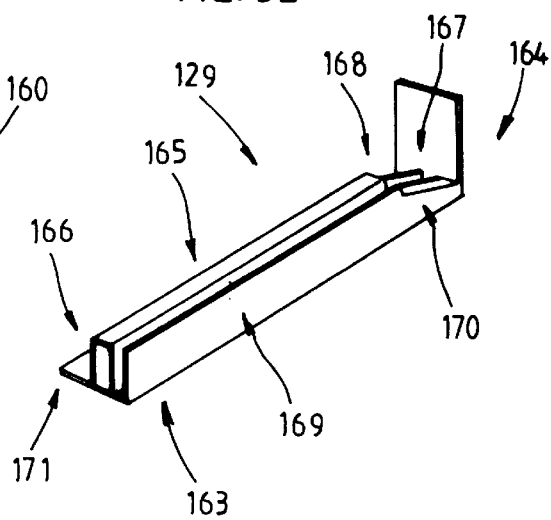
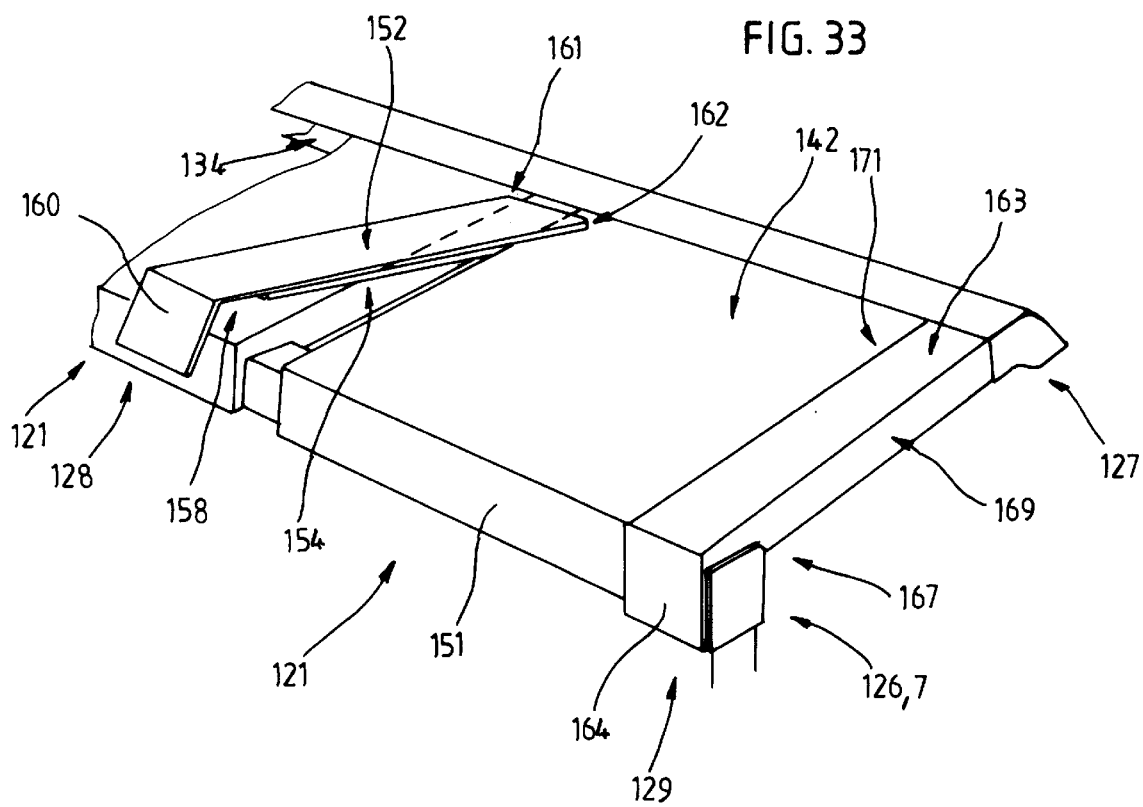

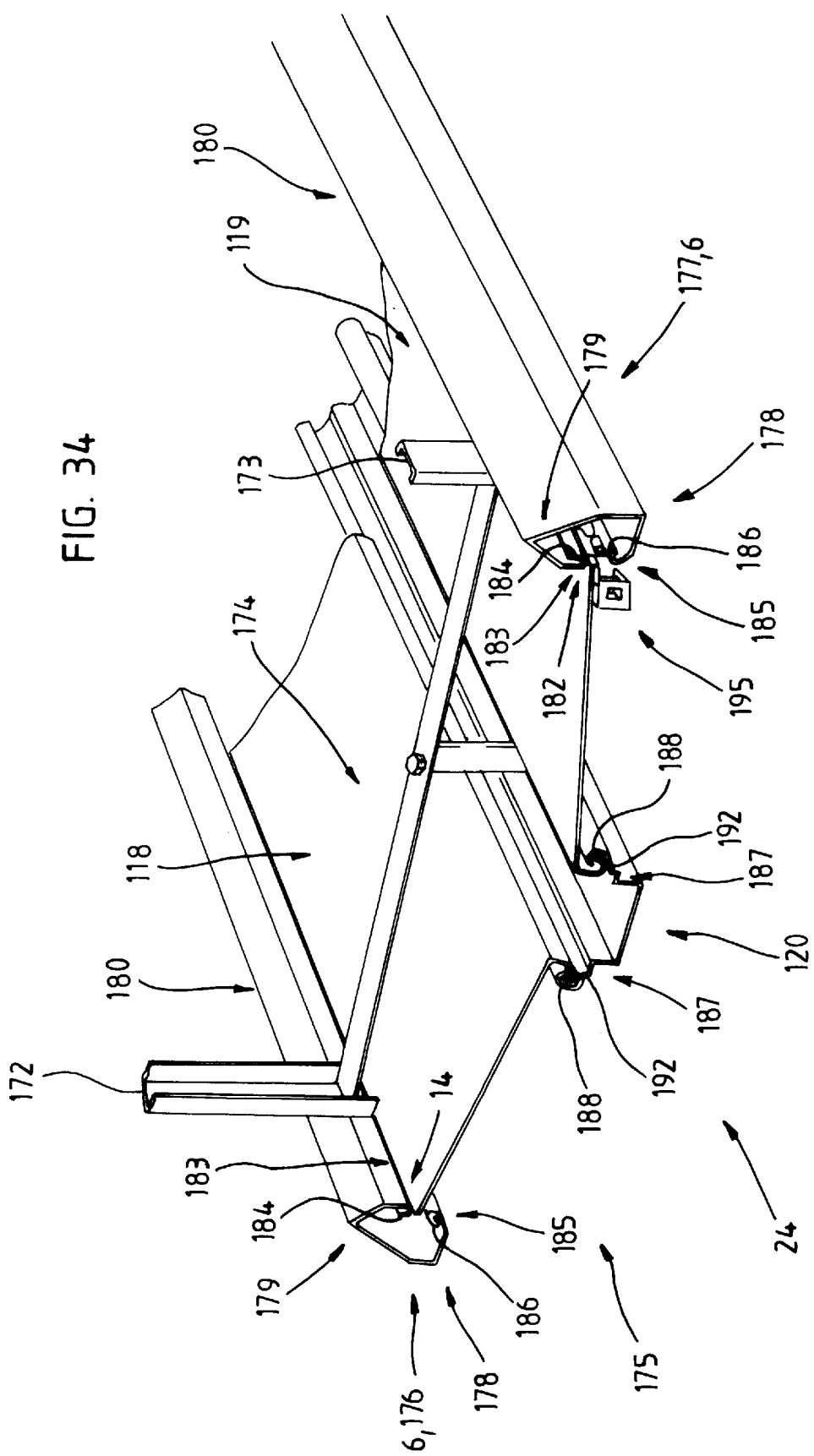

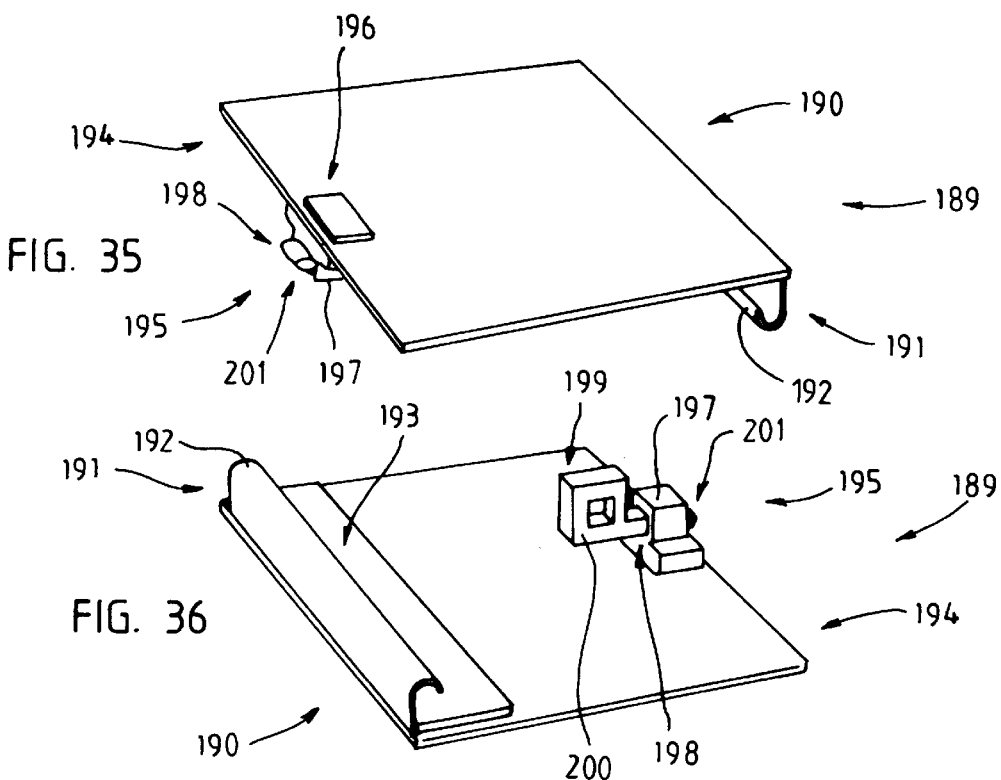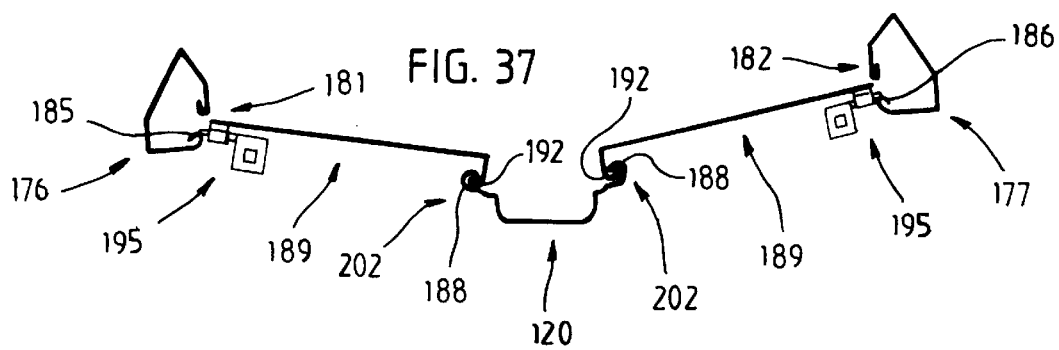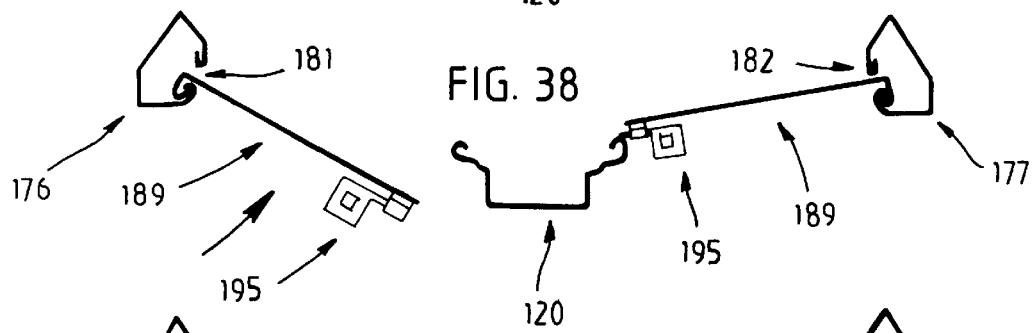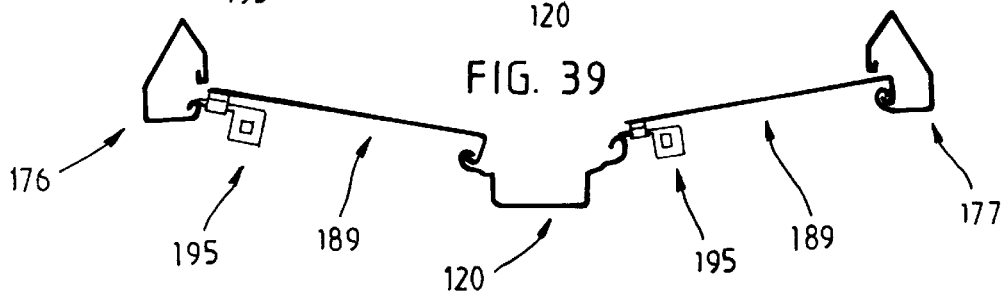

PROTECTIVE AND INSULATING ENCLOSURE WITH REMOVABLE PANELS FOR A TRANSFER UNIT

SCOPE OF THE INVENTION

The present invention relates to a protective and insulating enclosure with removable panels for a belt or chain conveyor.

It concerns in particular conveyors carrying foodstuffs such as drinks or solid food in rigid containers, but it also relates to other types of conveyor, for example those in premises for sorting, checking or despatching products.

TECHNICAL BACKGROUND TO THE INVENTION

The noise caused by the movement of glass bottles or metal boxes carried by conveyors from a filling station to a finishing, closing, sealing, corking or other station may reach sound levels that are high, or even dangerous or unbearable.

Covering assemblies are already known in the form of a tunnel or box intended to cover the conveyor in order to suppress or at least reduce the noise pollution and provide protection in the form of physical separation from the outside.

These covering assemblies are made from a lateral surface consisting of a series of noise-reducing panels connected together and mounted on a framework fixed to the uprights and to underframes supporting the conveyor. A transparent top enclosure in the form of a tunnel or box with an access hatch enables the conveying to be monitored and safety or maintenance operations to be carried out.

A bottom enclosure provides continuity of the sound insulation and physical protection.

All the parts constituting this protection are fixed to support members secured to the framework, which is itself mounted on the body of the conveyor or the underframes supporting it.

The fixing is effected in a conventional manner using screws, bolts, rivets etc. It does not therefore enable either rapid installation or removal to be carried out.

There are of course access flaps or hatches but these are localised at a few precise points situated almost exclusively on the top surface. These openings allow only limited access to a small area around the entry thus formed. In addition, they represent a significant additional cost.

In this regard, French patent No 2 454 986 in the name of MASSICOT can first of all be cited. This describes an embodiment, the top protection of which, consisting of tunnel-shaped hoods sliding in each other, is combined with a trough-shaped bottom protection provided with a noise-reducing cladding held at the edges by clamps and opening in the manner of a shell.

It should be noted, firstly, that this protection is suitable only for those portions of conveyors which are in a straight line.

Then, the basic components, including the bottom cover and the guide rails, prove to be difficult to remove. Because of this, an operation requiring the removal of these components will inevitably turn out to be slow and difficult.

Next, U.S. Pat. No. 4,093,066 in the name of the COCA COLA Company can be cited, which relates to a noise-reducing module in the general form of a tunnel with an enclosing return on the bottom part of the conveyor.

The lateral faces are sloping. One is opaque, extending beyond the top zone, and the other is produced in the form of a hatch.

These modules can be assembled in linear sequences by means of connecting ribs mounted on supports fixed to the underframes supporting the conveyor.

Special fastenings and a set of tools are required to assemble these modules.

Furthermore, the space to be insulated is not completely closed off. In the lower part there is an unprotected zone.

Finally, it is not possible to protect an entire conveyor system by means of a succession of such modules, since they are suitable only for straight lines.

The fitting of the supporting metal structure and then the installation of each component of the wall, with drilling and mounting of the fixing lugs, adjustment, tightening of screws, all involve significant down-time in terms of man hours.

Furthermore, the wall is difficult to modify. There is no simple way of replacing a single part following damage. Mounting and removal continue to be protracted operations which are difficult to carry out. They very often require the conveyor to be stopped.

As far as the top enclosing wall is concerned, it would be advantageous to be able to open up or free an area for observation and access for the purpose of a maintenance or repair operation on the transfer belt.

This function is at present provided by enclosing flaps mounted on hinges. These panels are difficult to manipulate because they are components of considerable size. In addition, they cannot be detached and are therefore a considerable hindrance for certain types of operation. In addition, replacing them proves to be a long and complicated process.

European patent No 102 910 in the name of the applicant describes an embodiment corresponding to this state of the art.

Furthermore, when bottles are being carried on a transfer unit, whether of the belt conveyor or other type, it happens that the shaking resulting from the motion or from mishandling cause the containers to tilt in such a way that part of their contents is spilt or causes a loss of balance in one or more of them which then fall on one side, spilling their contents and possibly being broken.

With a conveyor which is not protected at its lower part, the glass debris and liquid are scattered over a considerable area of the floor beneath the conveyor belt, access to which is difficult and which is therefore difficult to clean.

A fairing, particularly on the lower part, fulfills the function of guarding the conveyor and retaining and recovering debris and waste or spilled liquids, etc.

Different types of bottom fairing for protecting conveyors are known.

Fixed fairings are not very practical since they are themselves difficult to clean.

The bottom fairing described in French patent No 2 454 986 (MASSICOT) consists of panels mounted so as to pivot by lateral hinges on one side of the conveyor. Each panel is itself hinged to form two lateral parts.

Though this protection affords easy access to the conveyor and enables it to be cleaned, the hinged panels are cumbersome and heavy to manipulate. They form a permanent structure which is made to measure and is difficult to adapt to subsequent modifications of the conveyor.

In addition, if the debris and liquid are retained initially by the hinged panels of the fairing, there is a risk that, when the panel is opened at the bottom, they will be spilt on the floor.

Complete enclosure relates to both lateral enclosure and top and bottom enclosure along the conveyor in its straight, curved and angular parts.

SUMMARY OF THE INVENTION

To this end, the invention consists of a complete enclosure which is fully removable by the encasement/separation of removable panels for a transfer unit which consists of:

- a lateral surface formed by panels mounted, so as to be encased and removable, between a bottom carrier profiled section and a top holding profiled section and separated laterally by joining profiled sections,
- a top cover formed by sloping panels with an end encased in a linear cavity in a top rear profiled section, the panels being disposed so as to bear and lock on a front profiled section and being separated by joining profiled sections,
- a bottom enclosure consisting of a central collecting profiled section, two facing bottom carrier profiled sections, and removable plates sloping towards the central collecting profiled section.

The aim of the present invention is not only to make mounting considerably easier, but to provide rapid access to any area of the conveyor.

It enables all the drawbacks mentioned above to eliminated.

The advantages of the invention are numerous and significant. Some of them will be cited hereinafter.

The fitting of the wall is carried out quickly. Only the two holding profiled sections are fixed in advance, for example by screwing, to the top structure of the conveyor. The removable panels are then fitted in an obvious manner simply by insertion consisting of encasement, supporting and locking.

The wall can be adapted to all types of conveyor, because of the different designs of removable panels.

Replacing a damaged wall panel and modifying a part or all of the wall, according to requirements, are greatly facilitated.

The presence of pivoting flaps mounted on fixed hinges is made optional by the possibility of moving or shifting a panel in order to have access to the inside.

The wall according to the invention is mounted quickly. This does not require any equipment or set of tools. No adjustment of the different components is necessary.

The wall can be removed easily, entirely or in part, in order to obtain access to a particular area located at any point, or in order to replace a defective or damaged panel for example.

The shape of the wall can be adapted to many conveyor shapes by using different panels. The panels are interchangeable.

Assembly by fitting in is quickly achieved, reliable and effective. The design, without any added or moving locking part, is extremely simple.

The bottom insulation and recovery protection can be adapted to many widths and heights and to a straight or curved path on any conveyor.

Mounting is simple and rapidly achieved, the fixed structure being reduced to a minimum and the other parts being removable.

The size of the lateral plates is of little importance; they are not permanently hinged on the supporting structure but can be removed and taken away as required.

Access can thus be achieved very simply to one part or to an entire side of the lower part of the conveyor.

The recovery profiled section prevents liquids and debris from reaching the floor. It collects them in the lowest central part.

It proves to be much easier to clean this profiled section.

BRIEF DESCRIPTION OF THE DRAWINGS

The technical characteristics and other advantages of the invention are set out in the following description, provided by way of non-limiting example in relation to one embodiment with reference to the accompanying drawings in which:

FIG. 2 is a diagrammatic perspective view showing a panel and its two profiled sections, that is a bottom carrier profiled section and a top holding profiled section, before being mounted;

FIG. 3 is a view similar to FIG. 2, in the case of a panel in the form of a plate;

FIG. 7 is a perspective view of the rear of a flat lateral-join profiled section;

FIGS. 8 and 9 are perspective views of the rear of lateral-join profiled sections of the right-angled connection type, respectively salient and re-entrant;

FIGS. 10 and 11 are perspective views of the rear of lateral joining profiled sections of the obtuse-angled connection type, respectively salient and re-entrant;

FIGS. 12 and 13 are perspective views of the rear of lateral-join profiled sections of the end connection type, respectively left and right;

FIG. 14 is a perspective view of the rear of a lateral-join profiled section of the re-entrant right-angled connection type, with a change in the height of the wall;

FIGS. 15 and 16 are perspective views of the rear of lateral-join profiled sections of the right-angled connection type, respectively salient and re-entrant, with a change in the height of the wall, and a transverse transparent panel being held in position;

FIG. 17 is a perspective view of the front of a part of a wall illustrating the fitting and the overlapping and locking function of a a flat lateral-join profiled section;

FIG. 18 is a perspective rear view corresponding to FIG. 17 after the fitting of the intermediate component, with cut-aways showing the respective positions of the members between the two holding profiled sections;

FIGS. 28, 29 and 30 are diagrammatic cross section views illustrating the fitting of a removable panel between two carrier profiled sections;

FIGS. 31 and 32 are perspective views of the rear of profiled joining components, respectively a flat intermediate joining profiled section and an end joining profiled section;

FIG. 33 is a perspective view of a section of wall illustrating the fitting of a joining profiled section;

FIG. 34 is a general perspective view of bottom insulation and recovery protection;

FIG. 35 is a perspective view of one of the removable lateral plates constituting the protection according to the invention;

FIG. 36 is a perspective view of the flanged lateral plate;

FIG. 37 is a diagrammatic side view of the basic variant mounting of the removable hinged plates;

FIGS. 38 and 39 are diagrammatic side views of two other simple variant mountings of the plates;

DETAILED DESCRIPTION OF THE VARIANTS ILLUSTRATED

Figure 1:
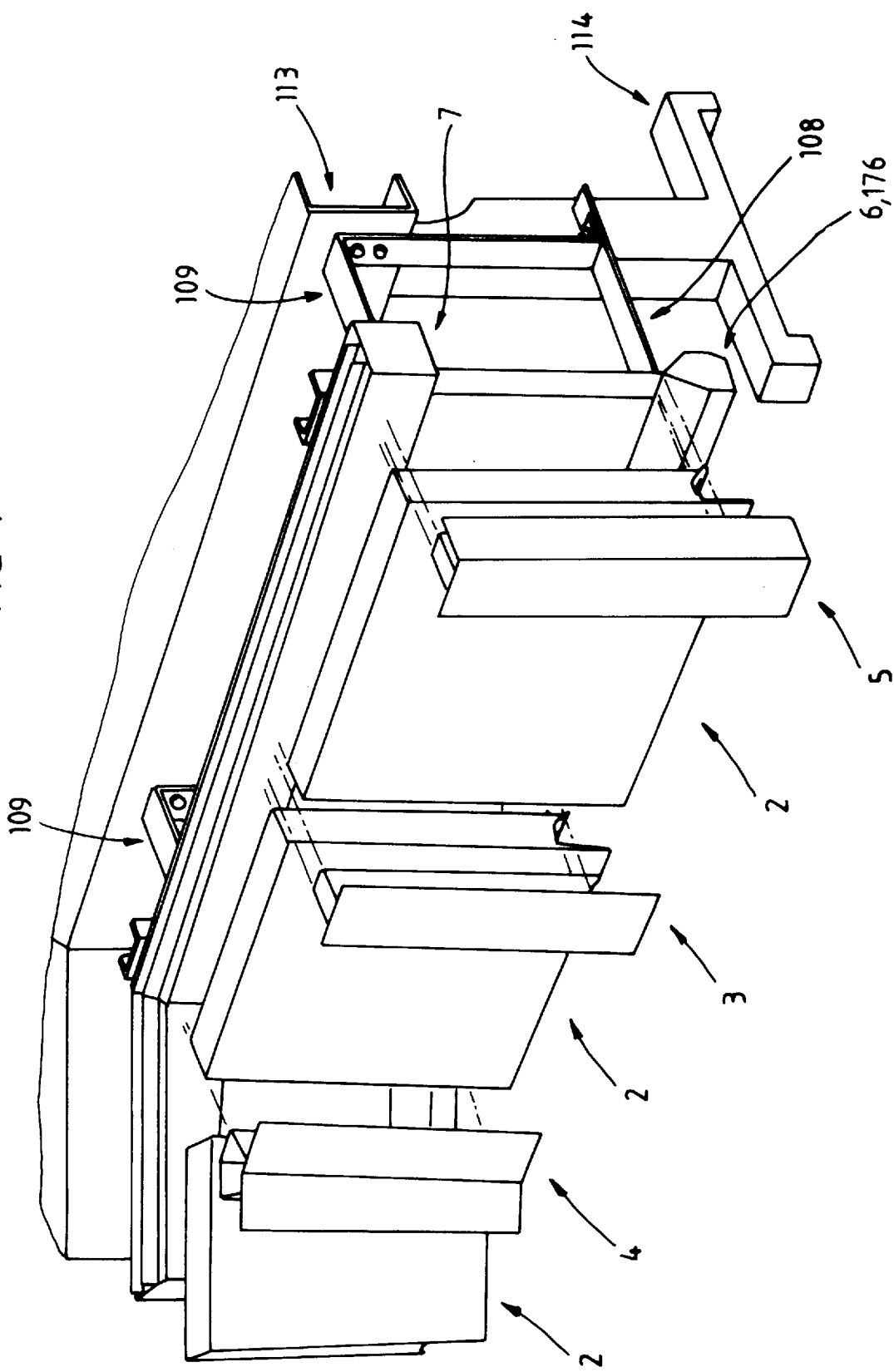
FIG. 1 is a partial perspective front view of a standard length of a lateral wall formed by mounting a series of members inserted successively into a top encasement profiled section, and resting on a bottom carrier profiled section.

The inventive step relating to this overall protection consists in making the complete conveyor enclosure solely from removable panels. It comprises, firstly, a lateral wall 1 for protecting a conveyor or other item of plant or equipment by means of a series of flat removable members or panels 2 separated by profiled components for lateral joining, for flat lateral joining 3, for corner joining 4 or end joining 5, these also being removable, carried and held without fastenings between two longitudinal rim profiled sections, respectively a bottom carrier profiled section 6 and a top holding profiled section 7.

It also comprises bottom protection and insulation and top protection formed by removable panels.

More particularly, the bottoms of the flat members or panels rest on the bottom carrier profiled section 6, said panels being immobilised thereby and being simply immobilised transversely, that is held vertical by the top holding profiled section 7 at their top.

The details and special features of the methods of immobilisation and holding of the members as well as the technical forms of the profiled sections will become clear from the following description.

The lateral protective wall according to the invention can be applied to a chain or belt conveyor or other piece of equipment, for example closed at the top by top protection and at the bottom by a fairing.

The invention relates to the entire lateral surface over the entire length of a conveyor, even at corners or curves in broken lines. It also relates to the two opposite transverse end surfaces.

By referring to the figures it can be seen that the lateral wall 1 according to the invention is formed in its straight parts and its parts in broken lines by the succession of flat members or panels such as 2 separated by components or profiled sections for lateral joining, for flat lateral joining 3 or corner joining 4, or end joining profiled sections such as 5.

These different members and components are shown in greater detail in the figures.

All the panels forming the lateral wall 1, for example for a conveyor, are mounted between a bottom longitudinal carrier profiled section 6 and a top longitudinal holding profiled section 7 forming the top longitudinal rim of the lateral wall, the top profiled section being disposed horizontally, parallel to the bottom carrier profiled section 6 and above the latter.

As has already been indicated, between these two longitudinal rim profiled sections 6 and 7, a series of removable panels 2, separated in a straight line or at the bends by the flat, corner or end lateral profiled sections, are mounted without any tools or equipment.

The method of latching onto the two rim profiled sections is the same for all the removable panels and lateral-join profiled sections.

The bottom carrier profiled section 6 is formed for example by profiling or cold bending and has a horizontal bottom face 8 with a turned-over longitudinal edge 9, two flat front and rear lateral faces 10 and 11, and two sloping front and rear top faces 12 and 13 of unequal size, which form a bevelled carrier ridge 14 and constitute, with the front lateral face, the means of support and immobilisation for the bottom of the panels.

The longitudinal edges of the rear lateral face and of the bottom face are separate and offset so as to form a longitudinal slot 15. The free longitudinal edge of the rear lateral face is curved in the shape of a channel so as to form a rim 16 providing guidance in sliding for a fixing counter-piece 17, shown in detail on FIG. 21, and holding it at an angle.

The top holding profiled section 7, in the general shape of a rectangular section, has two parallel lateral faces, front and rear, 18 and 19, joined by a top face 20. These faces define between them a parallelepipedal linear cavity for insertion or fitting in 21, completely open at the bottom and forming a receiving space for holding, after insertion, the top edges of the panels or of the linear facing cladding these edges to enlarge their cross section, or the top ends of the lateral-join profiled sections. The bottom edge of the rear lateral face 19 is curved so as to form a channel 22 for holding in a straight position and guidance in sliding for a fixing counter-piece 23 which can be seen in detail in FIG. 20.

The turned-over edge 9 of the horizontal bottom face 8 of the bottom profiled section acts as a pivoting hinge for the longitudinal edge, which is also turned over, of enclosing flaps which can form a bottom fairing 24 to complete the protection at the bottom part. These flaps, or any other type of protection forming the fairing 24 closing off the lower part of the conveyor, can also be simply inserted and immobilised in the longitudinal slot 15.

The top face 20 of the top profiled section 7 also enables the lateral wall to be associated with a top covering protection 25. For this purpose, it may be shaped in several different ways, according to the type of top protection.

First of all, there is a flat surface for the support, locking or fixing of the top protection panels, for example noise-reduction plates. The profiled section then has an overall cross section in the shape of a U opening downwards.

Next there is a longitudinal projection 26, with a rectangular cross section, intended to serve as a linear stop for the outer longitudinal edge of pivoting hatches (FIG. 3).

There are also guiding and locking structures in the form of two parallel rails 27 and 28 for the linear movement of tunnel-shaped hoods sliding in each other for another type of top protection.

In the figures, one or other of these variant configurations will be shown without discrimination.

These configurations of the bottom face of the bottom carrier profiled section with the turned-over rim returns, and of the top face of the top holding profiled section, which may be flat or with guide profiles, are therefore used to attach complementary protective members forming the bottom fairing and the top covering protection so as to form a continuous and complete protective enclosure around the conveyor belt, with the particular aim of providing noise reduction.

Figure 25:
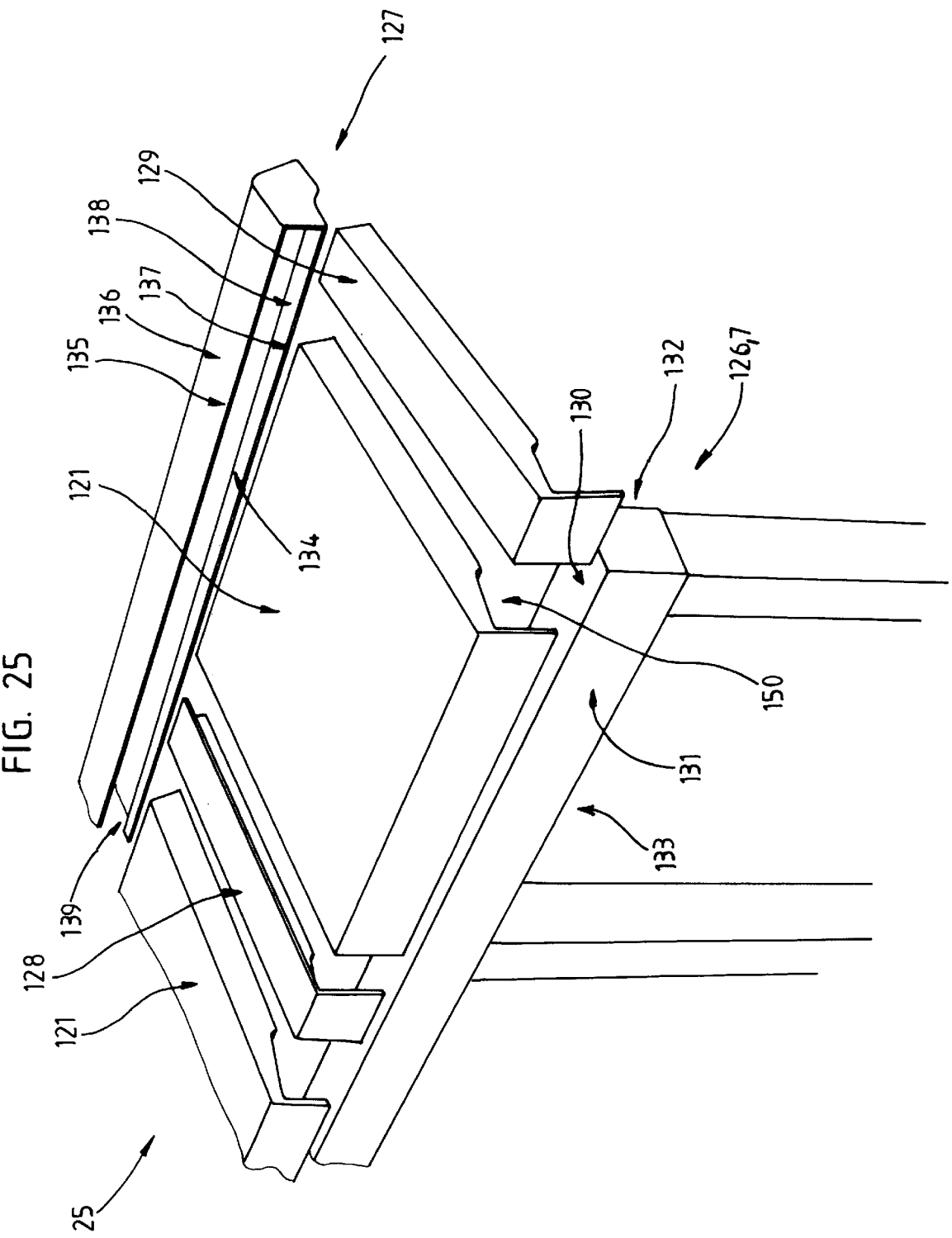
FIG. 25 is a partial perspective view of a top insulating wall for a transfer unit.

FIG. 25 should be consulted for an illustration of a conveyor equipped with such a protective enclosure.

Two panels forming the lateral wall 1, of different types, are shown in FIGS. 2 and 3.

First, a box panel 29 can be seen, in the form of a parallelepipedal box made of stainless steel sheeting, containing an insulating and noise-absorbing unit, for example one in the form of a foam cushion fully occupying the inside of the box.

Vibrations or the like are absorbed by the foam cushion through a perforated plate on the rear face 30.

On the outside, the panel has a flat front face plate 31. This front plate is of greater height than the box and its projecting bottom end forms an end fascia 32 extending at the bottom beyond the lower edge of the box, enabling the adjacent bottom carrier profiled section to be hidden and serving as a bearing surface against the flat front face 10 of the bottom profiled section.

The box also has a bottom face 33 having, along its rear longitudinal edge, a linear latching configuration formed in succession by a flat profiled section 34 and an angled linear bearing slope 35 cooperating with the rear top angled slope 13 of the bottom carrier profiled section 6 for the purpose of support and locking.

The thickness of the box, at least at its top end rim, is slightly less than the width of the insertion cavity 21 of the top holding profiled section 7, so that the panel can be engaged at an angle.

Figure 6:
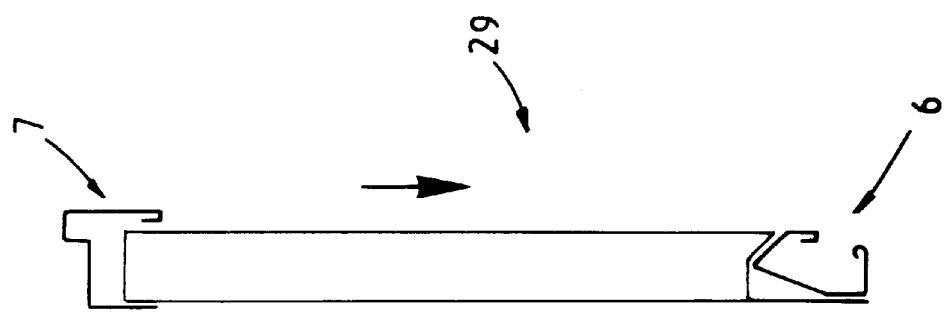
FIGS. 4, 5 and 6 are diagrammatic side views illustrating the mounting of a panel between the top holding profiled section and bottom carrier profiled section.
Figure 5:
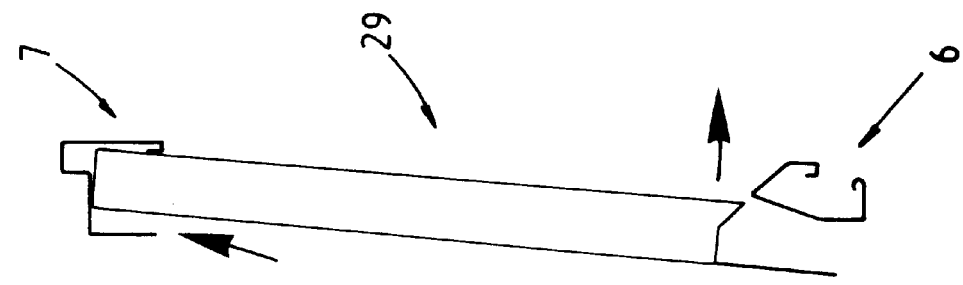
Figure 4:
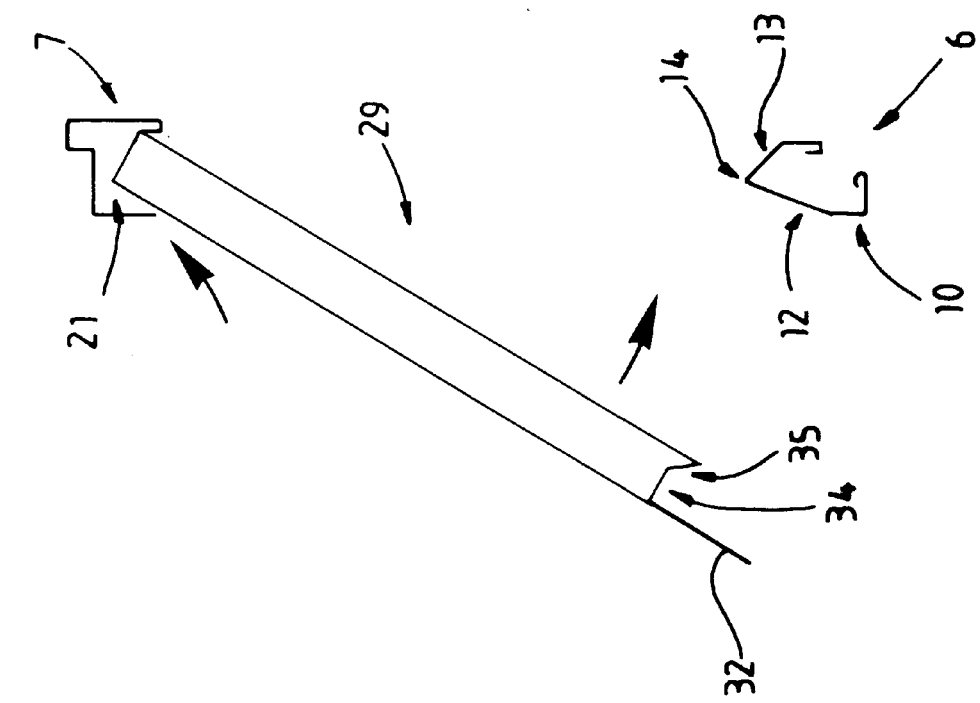

The panel is latched as described below with reference to FIGS. 4 to 6.

The top edge of the panel is inserted at an angle into the linear insertion cavity 21 of the top holding profiled section until it comes in abutment against its top face.

The panel is then brought back inwards until the bottom end fascia 32 comes into contact against the front face 10 of the bottom carrier profiled section, used as a stop. During this movement the angled latching slope 35 passes over the carrier ridge 14 of the bottom carrier profiled section 6.

The lateral panel is then released and comes to occupy a low position in which the angled linear supporting slope 35 comes into bearing contact against the rear angled slope 13 for support and latching on the bottom carrier profiled section 6.

The lateral panel is held straight by its top end because of the encasement in the linear insertion cavity 21 of the top holding profiled section 7, and because its bottom edge bears on the carrier ridge 14 of the bottom profiled section 6 which it straddles.

The bottom end fascia 32 projecting from the front face plate 31 of the lateral panel completely conceals the bottom profiled section 6.

To detach the panel, the procedure is very simply followed in reverse order.

The dimensions of the lateral panel are of course suited to those of the carrier 6 and holding 7 profiled sections. The height of the box forming each lateral panel is slightly greater than the gap between the said profiled sections. Its thickness is slightly less than the width of the linear holding cavity of the top profiled section, so as to enable it to be inserted obliquely. The angle and width of the angled bearing slope 35 enable it to pass over the carrier ridge 14 of the bottom carrier profiled section 6 during installation. The height of the end fascia 32 projecting downwards from the front face plate 31 is sufficient to conceal completely the bottom carrier profiled section 6 from the outside when the panel is in place.

The configuration of the bottom and top profiled sections 6 and 7 is also designed so as to facilitate the fitting and holding of the panels.

Thus the encasement cavity 21 of the top profiled section is of greater height than that of the inserted part of the top end of the panels once they have been installed, so as to be able to raise the latter in order to pass the latching slope 35 over the carrier ridge 14 during latching and unlatching operations.

In addition, the bevelled shape of the bottom profiled section enables the panels to be supported effectively, the rear slope 13 preferably being at an angle corresponding to the angle of the latching slope of the panels, whilst the front slope 12 may be either symmetrical, or sloping at a greater angle, as shown, so as to reduce the insertion angle required.

The front face 10 has the function of immobilising and locking the bottom edge of the panel with respect to inward movements, and the rear slope 13 has the function of immobilising it and locking it with respect to outward movement, in addition to its supporting function as an extension of the ridge 14.

A lateral panel of another type is shown in FIG. 3.

This is a panel of the plate or plate panel type 36, the flat component of which is made of transparent material. In this component, the box is replaced by a plate 37 made of mineral or organic glass in a rectangular format and with dimensions substantially identical to those of the box panel, so as to be equivalent thereto.

This transparent plate 37 has at its top end a top adapting profiled section 38 and at its bottom end a bottom adapting profiled section 39.

The purpose of these adapting profiled sections is to make the transverse edges of this type of panel, when they are provided therewith, completely equivalent to those of the box panels.

The top adapting profiled section 38 has a horizontal top face 40, two vertical flanges 41 and 42 projecting downwards along the front edge, forming a gripper intended to grip the top end of the plate 37, and a return 43 pointing downwards, of a generally convex shape, with a flat median linear abutment area 44.

The bottom adapting profiled section 39 has a longitudinal groove 45 enabling the bottom end of the plate to be inserted and locked. The outer longitudinal edge of the groove continues downwards in an end fascia 46 analogous to the fascia 32 of the box panels.

The inner longitudinal edge of the groove continues in a shape, resulting from folding, identical to the shape on the bottom edge of the box panels. This is a linear latching configuration in the form of a flat profiled section 47 analogous to 34, followed towards the outside by an angled linear bearing slope 48 analogous to 35 and intended to cooperate with the carrier ridge 14 of the bottom carrier profiled section 6.

The width of the profiled sections 6 and 7 corresponds to that of the box panel.

The end fascia described above as being integral with the bottom adapting profiled section can be produced separately and attached, fixed or welded to the edge of the bottom adapting profiled section 39 or directly to the bottom end of the plate 37.

It serves to conceal the bottom carrier profiled section 6, and to bear laterally against the front face of the bottom profiled section.

As indicated, it can be formed by bending the edge of the bottom adapting profiled section.

This panel 36 of the plate type is latched on, in a manner similar to the box panel, by means of the following movements: insertion obliquely, raising, tilting inwards and lowering until it comes into contact on the bottom carrier profiled section 6.

Longitudinal immobilisation of the panels in the holding profiles and the joining of two successive panels are effected by means of lateral-join profiled sections.

As already indicated, there are several types of these. There are as many types of lateral-join profiled section as there are types of join or overlap of a lateral end rim.

The lateral-join profiled sections which are suitable in the majority of cases are shown in FIGS. 7 to 16.

FIG. 7 shows a lateral-join profiled section intended to provide a coplanar connection between two successive panels. This is a flat lateral-join profiled section 3.

It is formed by a front face plate 49, of limited width, and which has a tubular vertical rear latching structure 50 of limited thickness. This latching structure also serves as a spacer between the two successive panels which are thus separated.

The rear structure 50 has a rectangular cross section and has a width such that the thickness of this flat lateral-join profiled section corresponds to that of the panels.

The bottom end of the structure has at the rear a latching projection 51, of a similar shape to the latching profiled section on the bottom edges of the panels.

The bottom end of the front face plate 49 extends below the end of the rear latching structure 50, having the function of aesthetic concealment, again with the purpose of hiding the bottom carrier profiled section.

The rear latching structure 50 of the flat lateral-join profiled section 3 is welded, in its median longitudinal part, to the rear face of the front face plate 49 so as to produce two lateral overlap flanges 52 and 53 on both sides.

Thus, when the profiled section is fitted between two successive panels disposed in the same plane, these lateral overlap flanges 52 and 53 overlap the lateral edges of the adjacent panels, enabling any residual transverse play of the top end of these panels in the linear encasement cavity of the top holding profiled section to be eliminated.

The fitting of a flat lateral-join profiled section 3 between two lateral wall panels is illustrated in FIG. 17. Of course, this flat lateral-join profiled section can be interposed equally well between two box panels or between two plate-type panels.

FIGS. 8 and 9 show right-angle lateral-join profiled sections such as 4, respectively salient 54 and re-entrant 55.

They have a body in the form of a corner angle 56 with the addition, at the front or rear, of a tubular longitudinal latching structure 57, 58 respectively in the case of a re-entrant or salient corner. The cross section of this tubular latching structure may for example be square.

The latching structure 57, 58 is similar to that of the flat lateral-join profiled section described previously. It thus has in its lower part a narrow 59 or wide 60 latching projection for the embodiments shown respectively in FIGS. 8 and 9.

These profiled sections have a bottom extension 61 corresponding to the bottom end fascia.

These corner lateral-join profiled sections 54, 55 are placed at the end of a coplanar series of panels at the point where they change direction at right angles. As can be seen in the figures, the flanges of the corner angle 56 conceal the adjacent edges of the panels and holding profiled sections by overlapping.

The overlapping flanges provide the joining and eliminate any play with the adjacent wall panel.

FIGS. 10 and 11 show corner lateral-join profiled sections 62, 63 in the case of obtuse angles, re-entrant and salient respectively. Each one consists of a corner angle 64 with two adjacent flanges in a dihedron at the chosen angle, and has a specific rear tubular latching structure 65 and 66 with a split vertical rear extremity, either re-entrant 67 or salient 68. Its top end, which is of standard thickness, enables it to be inserted and locked in the rim profiled section, and its bottom end has a structure in the shape of a latching projection which is double and narrow 69 or single and wide 70, projecting downwards, for support and latching on the bottom carrier profiled section 6.

FIGS. 12 and 13 show end-corner lateral-join profiled sections such as 5, opening in a salient right angle 71 and 72 and which can also be used in the case of plate panels. They have a body in the form of a corner angle 73 and a thin rear tubular latching structure 74, attached to one or other of the flanges of the corner angle.

The latching structure in this case has a rectangular cross section and is of standard thickness corresponding to that of the panels, with an identical latching projection 75 located on the bottom end of the rear face.

FIG. 14 shows a re-entrant right-angle lateral-join profiled section 76 with a change in the height of the wall.

It has a body 77, tubular in shape overall, with two adjacent flanges 78 and 79 forming a right angle, the flange 78 being of a greater height than the other and extending beyond it at the top end to define a support shoulder 80.

The rear latching structure 81, the overall shape of which has a rectangular cross section, has a bottom latching projection 82 and a top bevel 83 at the rear of the high flange 78 for insertion and locking in the corresponding top holding profiled section 7.

FIGS. 15 and 16 show complementary corner lateral-join profiled sections holding a plate 84, which may for example be transparent.

A salient corner joining profiled section 85 has a body similar to that of FIG. 13 with a corner angle 86 forming a salient right angle and a rear structure 87. The gap between the rear latching structure and the adjacent transverse flange forms a vertical gripper open towards the rear providing a linear receiving space into which is wedged one of the transverse edges of the transparent plate.

The other right-angle joining profiled section 88 is re-entrant. It is made up in a way similar to FIG. 15, having a vertical gripper 89, open towards the front, providing a linear space for holding the opposite transverse edge of the plate and an adjacent flange 90 forming a right-angled return 91.

The above two complementary joining profiled sections 85 and 88 may be of equal heights, or else different as shown.

The corner lateral-join profiled sections described above have a joining or connecting function with a view to completing the encasement of the panels and producing different geometric shapes of lateral wall so as to enable the panels to be fitted into and onto the holding profiled sections according to the shape of the latter. When they are fitted they overlap the edge of the adjacent panel on one side or on both sides at once, depending on circumstances.

Other configurations of panels and lateral-join profiled sections can be envisaged. These profiled sections must have a latching structure with a top end of a suitable width for insertion and encasement in the top holding profile 7, and a bottom end equipped with a projection or rear latching slope for bearing and locking on the bottom carrier profiled section 6.

These lateral-join profiled sections will have on one or both sides a flange for overlapping the transverse edge of the adjacent panel.

All of the components forming the protective wall and other variants or types of components are of similar dimensions as far as the latching parts (the top and bottom ends of the latching structures) are concerned.

They are of identical height. Several heights can be envisaged depending on the model of conveyor or depending on the cross section of the conveyor along which the protective wall according to the invention is installed.

The panels may also be of different lengths and the lateral-join profiled sections of different shapes, so as to make it possible for the wall to be continuous, whatever the type of path followed by the conveyor, notably short or long straight lines, right-angled or curved bends, offsets of all kinds, etc.

Figure 22:
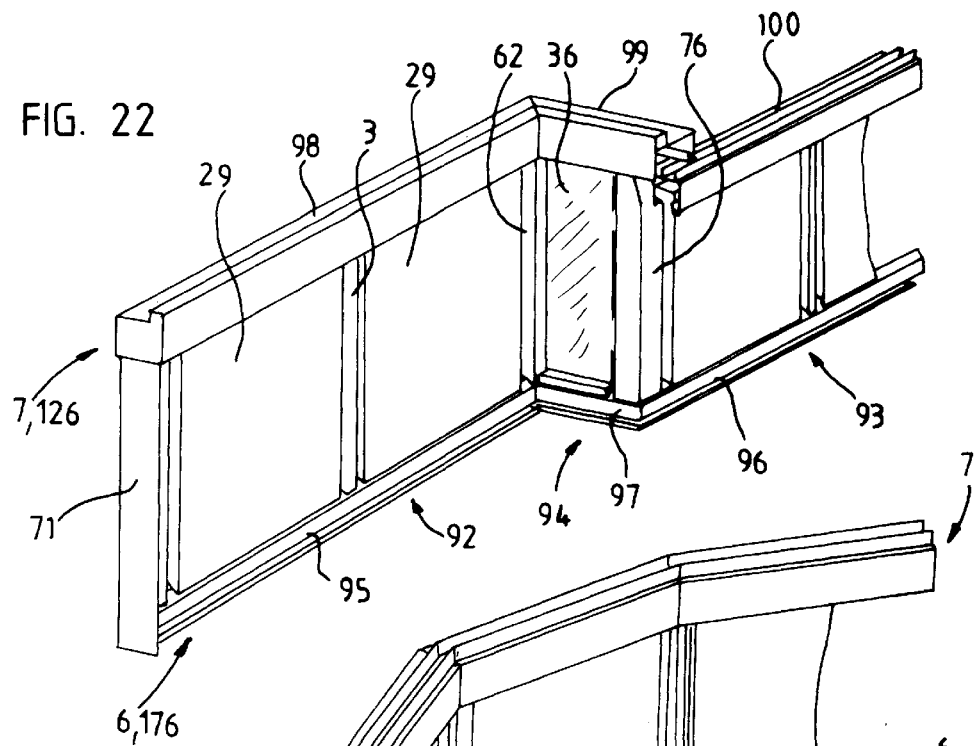
FIGS. 22, 23 and 24 are perspective views of the rear of linear portions of lateral walls made from panels and joining and end profiled sections.
Figure 23:
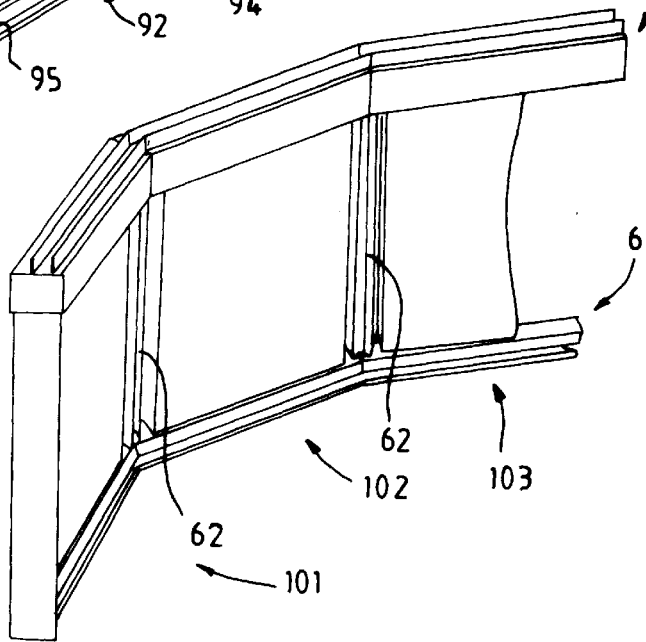
Figure 24:
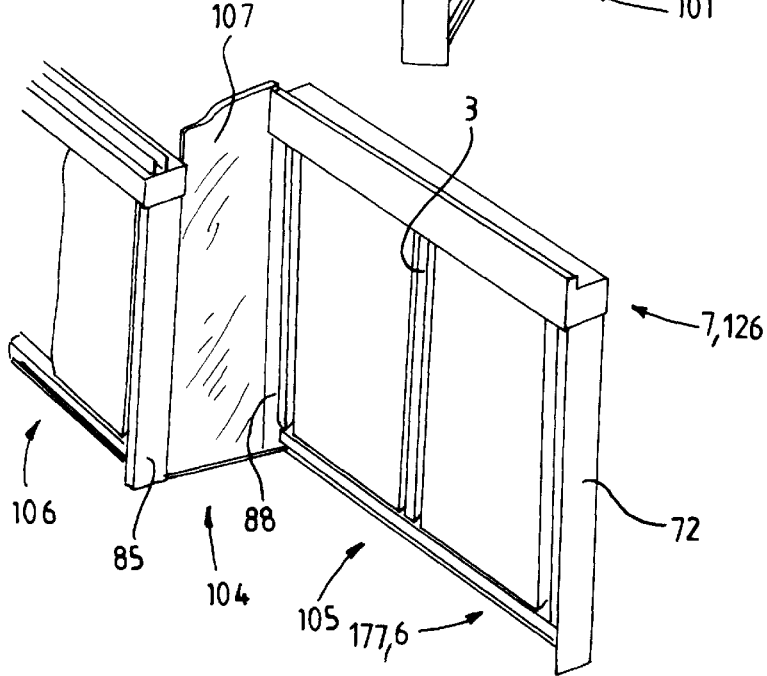

Examples of parts of lateral walls formed by means of panels and lateral-join profiled sections as previously described are shown in FIGS. 22 to 24. In order to show the fitting of the components into and onto the holding profiled sections, the parts of the wall are shown from the rear.

FIG. 22 shows part of a lateral surface with a change in width of the conveyor and a change in height of the lateral wall.

The lateral parts and adapted joining profiled sections of the protective lateral wall according to the invention thus make it possible to change from a high lateral wall which is shifted forwards 92 to a low lateral wall set back 93, by means of an intermediate transverse linking part 94.

The bottom carrier profiled section 6 is continuous at the same level with a part shifted forwards 95, a part set back 96 and a transverse intermediate part 97.

The top profiled section is discontinuous, having a part which is shifted forwards 98 comprising an intermediate transverse end 99 and a part set back 100.

This intermediate wall is produced by means of an end joining profiled section such as 71, two box panels such as 29 separated by a flat lateral-join profiled section such as 3, a salient corner joining profiled section such as 62, a plate panel such as 36 in a transverse position, a profiled section for joining in a re-entrant corner and joining over the height, symmetrical with the one shown at 76 in FIG. 14, and then a series of panels.

FIG. 23 shows a part of a lateral wall with two projecting corners, at 135° for example, which combined form a right-angled bend.

The whole is divided into three parts of a wall of the same height, respectively straight 101, oblique 102 and at right angles 103. The top holding 7 and bottom carrier 6 profiled sections are also continuous and in three parts.

Box panels such as 2 are separated by salient corner profiled sections such as 62.

FIG. 24 is a view analogous in symmetry to FIG. 22, but with a transparent transverse part 104 between a part shifted forwards 105 and a part set back 106.

The bottom carrier 6 and top holding 7 profiled sections are made in two non-continuous parts.

The top part of the wall is also made with an end joining profiled section such as 72, two panels such as 2 separated by a flat lateral-join profiled section such as 3, and the bottom part with a succession of panels.

The corner connections are made with two complementary adapting joining profiled sections such as those at 85, 88 described with reference to FIGS. 15 and 16.

Between these two profiled sections is placed a transparent plate 107 which may be interrupted, or extended above the lateral wall as suggested in these figures.

Figure 19:
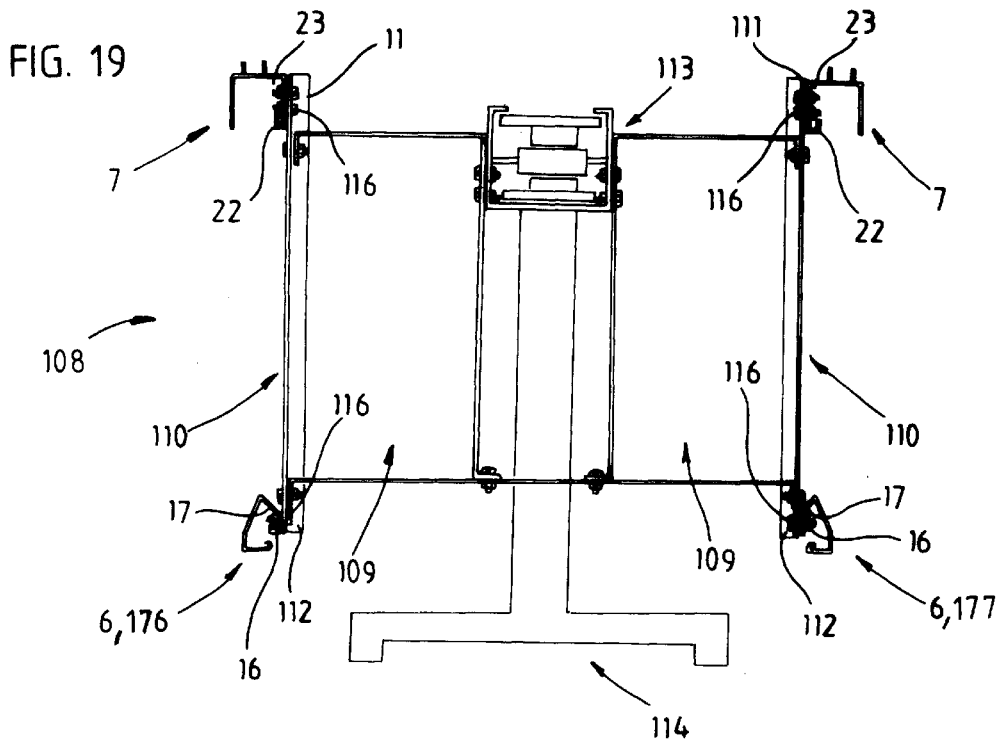
FIG. 19 is a diagrammatic cross section view of a length of conveyor showing a structure for fixing the holding profiled sections.

Generally, as mentioned above, the holding profiled sections may be fixed simply and quickly to a supporting structure of the framework type 108 like the one shown in FIG. 19. The framework consists, for example, of transverse supporting frames such as 109 disposed on each side, the outer uprights of which, such as 110, have ends projecting upwards 111 and downwards 112, for fixing the holding profiled sections. These supporting frames are mounted on the body 113 of the conveyor or on the underframes supporting it, for example the supporting uprights or the underframes such as 114 or 115 of the transfer belt.

The profiled sections 6 and 7 are mounted on the outer uprights of the supporting frames by means of screws such as 116 passing through the rear face of the bottom carrier 6 or top holding 7 profiled sections and engaging, for the purpose of locking, in the fixing back-pieces 17 and 23 acting as nuts movable along said profiled sections.

Figure 20:
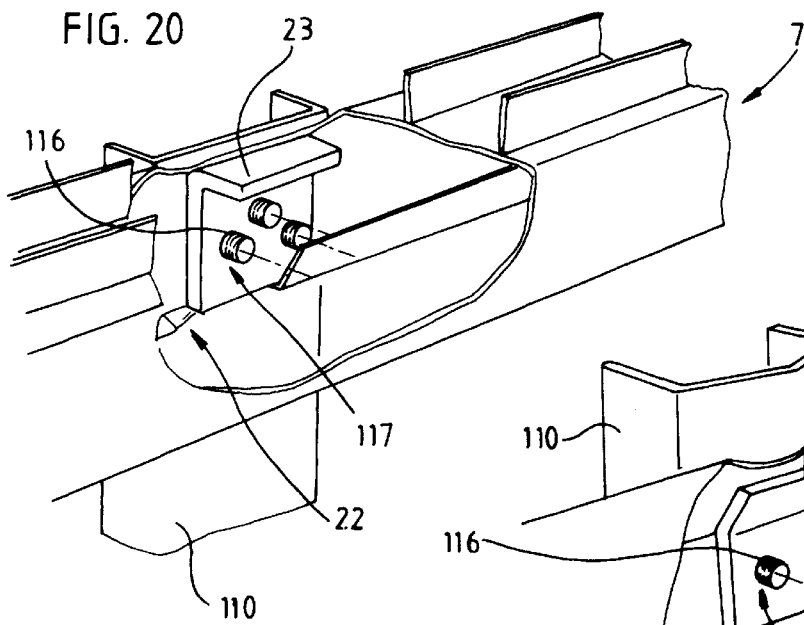
FIGS. 20 and 21 are perspective views of the top and bottom profiled sections respectively, partly open to show the mounting of the holding profiled sections on the fixing structure.
Figure 21:
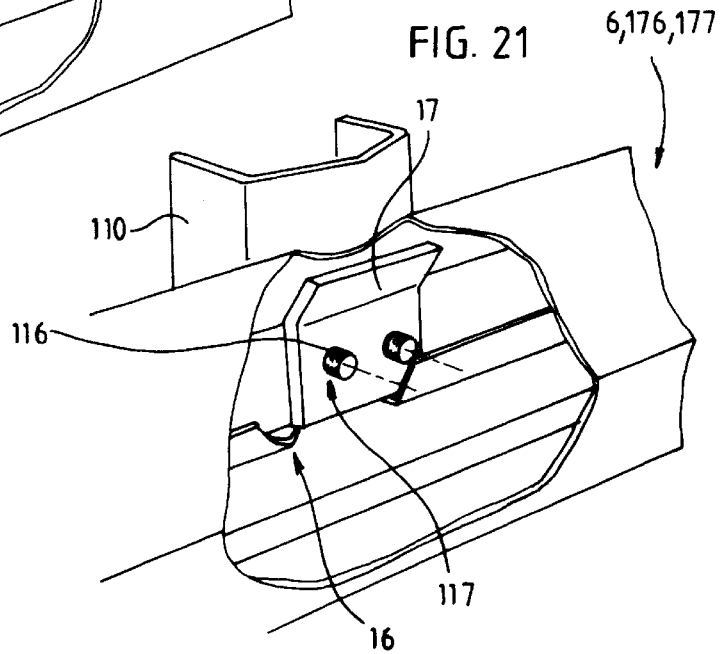

These back-pieces 17 or 23, specific to each profiled section, shown in FIG. 20 for the top profiled section and in FIG. 21 for the bottom profiled section, are inserted into the rear channel-shaped groove 16, 22 respectively on one profiled section or the other, along which the said back-piece can slide in order to be placed in position so as to present one or more threaded holes such as 117 having a diameter suited to the fixing screws 116, opposite the drillings in the rear face of the profiled section in line with the fixing components of the framework.

The fact that these fixing back-pieces are able to move along the rear channels of the profiled sections thus enables fixing to take place at any point along either profiled section.

Figure 43:
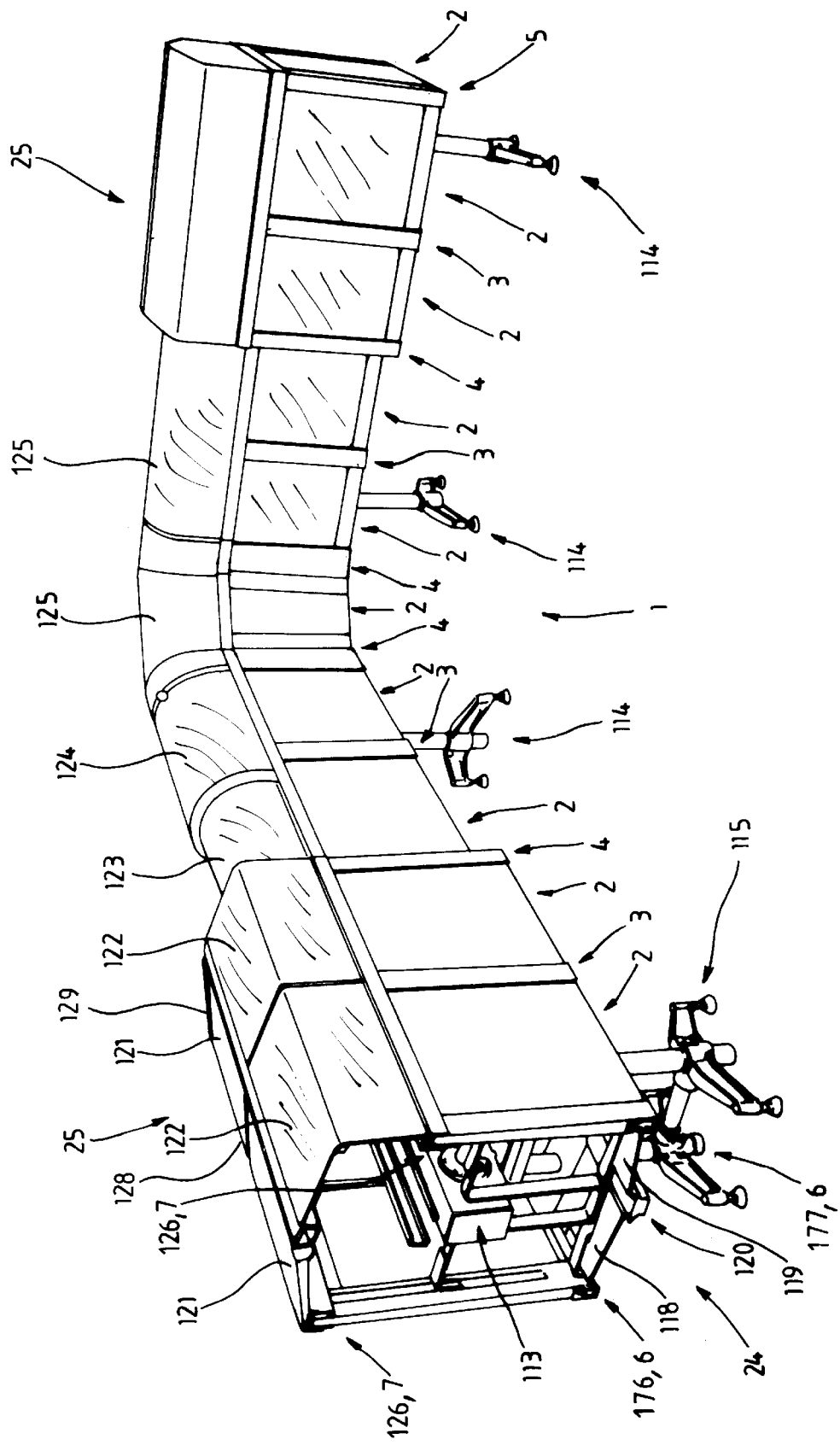
FIG. 43 is a perspective view of an example of a conveyor using left-hand and right-hand lateral protective walls according to the invention, combining a length in the form of a tunnel and two parts fitted with box-type protection.

To provide better support and adhesion and greater rigidity, these back-pieces will be flat, of rectangular shape overall, profiled according to the shape of the angled part of the adjacent lateral face of the profiled section. A general view of a length of conveyor equipped with a protective enclosure including the lateral wall according to the invention is shown in FIG. 43.

The said wall consists of various successive top or bottom parts using different components, box or plate panels and joining profiled sections.

The bottom protection 24 with which the lateral wall is associated consists of plates such as 118, 119 sloping slightly towards a inner central recovery profiled section 120. On each side, the curved rim of these plates is inserted into the longitudinal slot 15 of the bottom profiled section and mounted so as to pivot like a hinge on its curved edge 9.

The top protection 25 consists, depending on the part of the conveyor concerned, of covering panels such as 121 bearing and locking on the top profiled section of the type having a flat top face, hatches such as 122 hinged so as to pivot, locked in a closed position against the projection 26 offered by this type of top profiled section, or double hoods such as 123, 124 sliding in each other along the guide rails according to the other type of configuration of the top profiled section, or fixed such as 125, straight or angled.

The top protective and insulating wall 25 forms, with the lateral wall and the bottom enclosure of the conveyor, an entirely closed enclosure.

Preferably, the top cover 25 is produced in the form of a covering in the shape of a roof with two slopes which may for example be symmetrical, so as to form a protective box. It may also consist, on some lengths, of protection provided by curved panels in the shape of a tunnel or hoods 123, 124 sliding in each other or fixed 125, either straight or angled.

The wall forming only one side of the top cover 25 will be described below.

Referring to FIGS. 25 to 33, a standard section, installed on a conveyor, of the top protection 25 according to the invention comprises a succession of top panels such as 121. These flat panels are disposed successively in a horizontal position or one slightly sloping towards the front between two longitudinal horizontal holding profiled sections, respectively a front supporting profiled section 126 and rear encasement profiled section 127.

The flat panels 121 may be replaced as shown in FIG. 43 by hatches 122.

The flat top panels 121 are separated by joining profiled sections: for intermediate flat joins such as 128 and end joins such as 129, etc.

These joining profiled sections enable the top panels to be encased and the aesthetic appearance of the enclosing wall to be perfected.

As has been mentioned, the rear profiled section is situated slightly higher than the front profiled section, so as to obtain an enclosing wall which slopes gently forwards. This arrangement enables a covering to be produced in the shape of a roof with two slopes, by disposing a similar wall symmetrically on the other side of the conveyor. The rear profiled sections are then joined together, or even integrated, and form the ridge of the roof.

Of course, the wall can also slope to a greater or lesser extent, be perfectly horizontal, or even slope in the other direction.

The front supporting profiled section 126 has a rectangular cross section overall.

It can advantageously be formed by the profiled section forming the top rim of the lateral protective wall of the conveyor.

It has a horizontal top face 130 serving as a support for the succession of panels, two vertical lateral faces, front 131 and rear 132, and a bottom face 133.

It has no opening. It may in addition be closed at its ends by transverse end faces.

The rear profiled section 127 is of a generally rectangular shape. It slopes slightly forwards in accordance with the slope of the top wall.

It has a linear receiving cavity 134 on the whole of its front lateral face so as to form a longitudinal housing for the engagement and locking encasement of the rear end of the removable panels, the front end of these components resting on the front profiled section.

The linear receiving cavity 134 is defined by a top edge 135 formed by the top face 136 of the profiled section 127 and a bottom edge 137 formed by the bottom face 138 of the profiled section. This bottom edge 137 is slightly shifted upwards, so as to form, inside the linear receiving cavity 134, a bottom clearance 139 to enable the wall panels to be engaged in the housing at an angle.

The wall panels 121 are fitted by engaging their rear end 140 in this rear profiled section, their front end 141 resting on the front profiled section.

Figure 27:
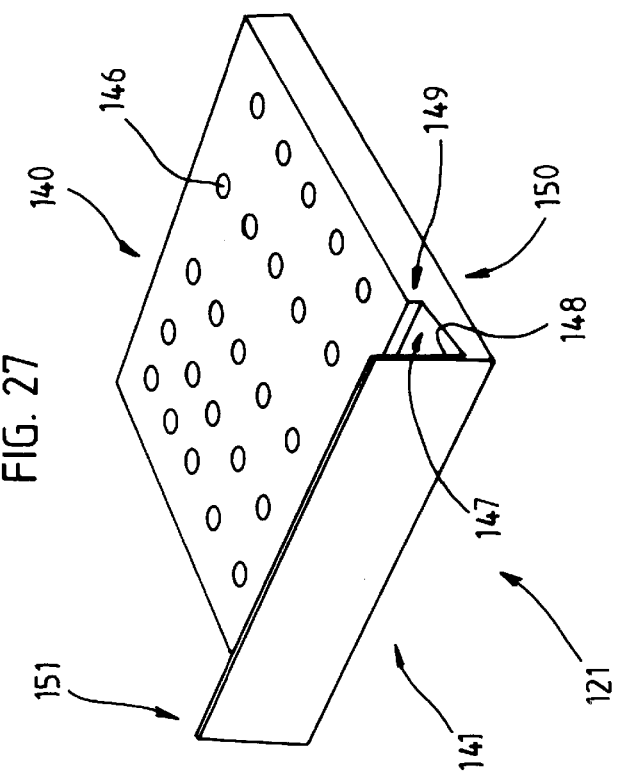
FIGS. 26 and 27 are perspective views of a flanged box-type removable panel shown respectively from the front and rear.
Figure 26:
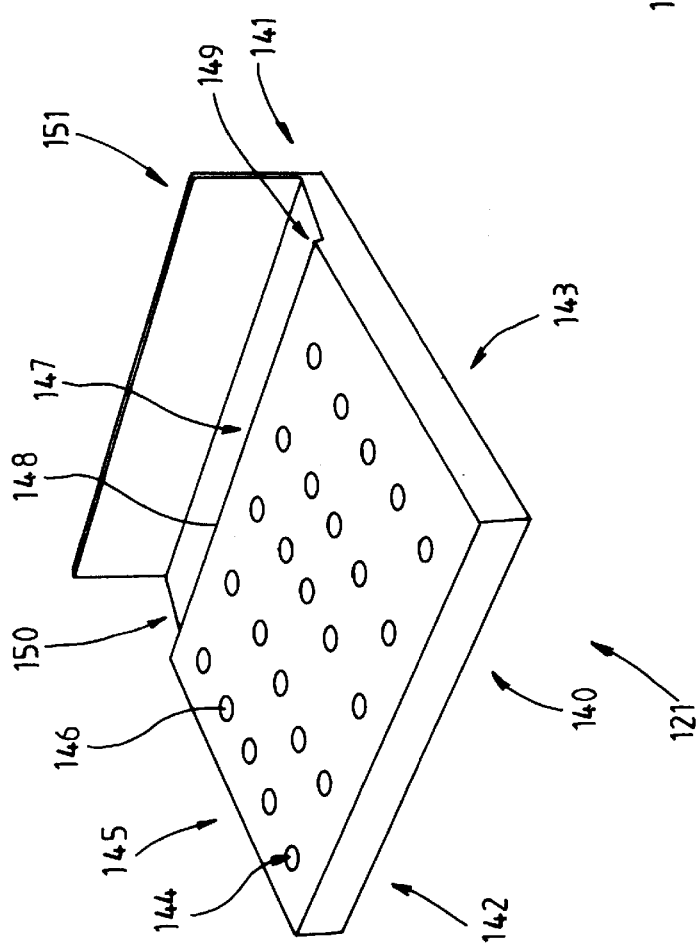

First of all, one of the standard top panels 121 of the insulating and noise-reducing box panel type will be described with reference to FIGS. 26 and 27.

This panel consists of an top face plate 142 or outer plate with a width corresponding to the gap between the supporting profiled sections and of variable length, fixed to a piece of protective bodywork in the form of a box 143 having the general shape of a parallelepiped, said box being able to contain insulating and noise-reducing material 144, for example foam.

The box is delimited on the top by the top plate 142, and at the bottom by a bottom plate 145, rectangular in shape overall, parallel to the outer plate, and with holes such as 146 in it. The thickness of the box, in particular at the rear end rim 140 of the panel, corresponds, with just slight clearance, to the distance between the top 135 and bottom 137 edges of the receiving linear cavity 134 of the rear profiled section 4.

The panel has, on the under-face of its front end rim 141, a shallow longitudinal recess 147, with a flat bottom 148 sloping slightly forwards with respect to the outer and inner panel plane, and having a width corresponding to that of the front supporting profiled section 126, delimited by a rear longitudinal locking shoulder 149 defining a supporting and locking profiled section 150 slotting into the top 130 and lateral rear 132 faces of the front supporting profiled section 126.

The panel also has at its front end a rectangular vertical flap or fascia 151, projecting downwards. This fascia is pressed against the front lateral face 131 of the front profiled section 126 when the panel is in place, so as to conceal said profiled section.

The fitting of the panel is carried out as described below (with reference to FIGS. 28 to 30).

The rear end 140 of the panel is inserted into the engagement opening of the receiving linear cavity 134 of the rear holding profiled section 127, the panel being presented slightly at an angle.

When this end reaches the back of the linear receiving cavity of the rear profiled section, the abutment an d locking profiled section 150 comes into position above the front profiled section 126 and, by a simple slight pivoting movement, this abutment profiled section is immobilised in abutment on the front profiled section.

The rim shoulder 149 has the function of a stop preventing the panel from sliding transversely towards the front. The panel is also immobilised transversely with respect to backward movement by the front end fascia 151.

In addition the front end fascia masks, in this position, the front supporting profiled section 126, in order to provide a better aesthetic appearance.

The wall panel is locked transversely but not longitudinally, and it can be positioned simply by being made to slide along the supporting profiled sections.

Of course, other types of panel can be envisaged, for example panels having a transparent surface instead of a noise-reducing box, etc.

However, each panel has a rear end rim for engagement and encasement in the receiving linear cavity 134 of the rear profiled section, of a thickness which corresponds, with just slight clearance, to the height of the engagement opening of the rear profiled section, and a front end rim defining an abutment profiled section with a shoulder or other projection for transverse locking, complementary to the shape of the cross section of the front profiled section.

FIG. 31 shows one of the joining profiled sections, of the type consisting of a flat intermediate joining profiled section 128 between two panels.

It consists of a narrow top sheet 152. This sheet has on its under-face 153 a tubular reinforcement and mounting structure 154 of rectangular cross section.

The unit formed by the structure 154 and top sheet 152 has the standard thickness for engaging in the receiving cavity of the rear profiled section, in particular at the rear end rim 155 of said structure 154.

At the front end rim 156, the profiled section has a cut-out 157 of a similar shape to the indentation in the form of a notch in the panel, defining an abutment profile 158 with a shoulder forming a locking lug 159.

The panel has a return 160 at its front end masking the front supporting profiled section.

In a specific manner, the sheet 152 extends laterally beyond each side of the tubular structure 154, so as to form two overlap flanges 161, 162. When the intermediate panel is in place between two panels, these lateral flanges overlap the adjacent edges of said panels on each side.

The presence of these overlap flanges ensures the encasement of the panels in the rear profiled section, as well as the aesthetic continuity of the whole of the top wall.

The vertical return 160 at the front end is of the same width as the top plate and therefore also overlaps laterally, respectively on each side, the front end fascias of the adjacent panels.

FIG. 32 shows another joining profiled section of the end join profiled section type 129.

This profiled section is formed, in a similar manner to the preceding one, by a top face sheet 163 with a vertical front end return 164, and a tubular reinforcement and mounting structure 165 fixed to the under-face 166 of the sheet 163, comprising an abutment and locking profile 167 and a transverse locking lug 168. However, the sheet has in addition, along one side of the sheet 163, an end fascia 169 to conceal the profile of the closure at its end.

This fascia 169 forms a right angle with the sheet 163 and has a cut-out 170 corresponding to the shape of the tubular structure 165, so as to fit the shape of the front supporting profiled section when put in position.

The other side of the top sheet 164 has an overlap flange 171 for the edge of the adjacent panel.

Of course, the fascia 169 can be disposed on the right as seen from the front, as shown, or on the left, in order to place it at one or other end of the enclosing wall.

Other types of profiled joining component can of course also be envisaged, for example in order to adapt to a change in the width of the wall, or in its height.

As has been mentioned, these joining profiled sections are intended to be disposed between or against the panels or to nest in them, in order to achieve perfect cohesion throughout by eliminating any residual play, by virtue of the presence of overlap flanges projecting laterally and overlapping the adjacent edge of the said panels.

These overlap flanges may be formed very simply by the projecting edges of the top face sheet, as shown.

At the level of the encasement housing of the rear profiled section, each lateral flange of the top face sheet of the joining profiled section is interposed between the rim of the adjacent panel and the top edge of the opening, so as to eliminate any residual play in the engagement of the panel member by pressing the end rim of the panel against the bottom edge.

The joining profiled sections also make it possible to perfect the outer appearance of the wall by concealing the gaps at the joins between the panels.

The invention has been described in an embodiment with two profiled sections, front and rear, which are slightly offset in height so as to confer a slight slope on the protective wall.

Of course, as has been mentioned, other arrangements or combinations of profiled sections can be envisaged, in particular two profiled sections disposed at the same height for a horizontal wall, or two lateral lower profiled sections and one double ridged profiled section for a top wall with two slopes.

Again, the central double profiled section can be replaced by a single central profiled section having two longitudinal engagement/encasement openings on each side.

FIG. 43 shows an example of an embodiment of the top enclosure for a transfer unit according to a composite embodiment comprising the box-shaped top cover 25 at each of its ends in the form of a box composed of panels 121 and observation hatches or flaps 122.

This top cover also uses tunnel-shaped components, which may be fixed 125 or sliding 123, 124, hinged observation flaps 122 and panels such as 121, separated by joining profiled sections such as 128, 129.

The supporting profiled sections are fixed to a support structure fixed for example to underframes such as 114 and 115 supporting the body of the conveyor.

The insulating box comprises, in addition, lateral protection also made of removable panels 2 separated by the joining profiled sections 3, as well as the bottom protection comprising the plates 118 and 119 sloping towards the central recovery profiled section 120.

This bottom protection will be described below.

The bottom insulation and recovery cover 24 forming a fairing seals off the bottom of the conveyor through the mounting of a series of removable flat enclosing members such as 118 and 119 disposed between the central recovery profiled section 120 and longitudinal carrier profiled sections, the enclosing members being mounted simply by latching/hinging along one longitudinal edge and immobilising by snapping onto the opposite edge.

This covering, which provides the bottom insulating and recovery protection 24 for the conveyor, shown in FIG. 34, is mounted on a framework of which only two fixing uprights 172 and 173 and one connecting cross piece 174 are shown.

The protection comprises a fixed supporting structure 175 and the flat removable enclosing members of the pivoting flap type 118 and 119.

The supporting structure is composed of two longitudinal lateral latching profiled sections 176 and 177 and the central recovery profiled section 120. The longitudinal lateral latching profiled sections will preferably be formed by the facing bottom carrier profiled sections such as 6 of a lateral protection wall.

The longitudinal lateral latching profiled sections 176 and 177 are for example formed, by bending, from sheet metal and have a tubular cross section with a U-shaped bottom part 178 completed at the top 179 by an apex forming a longitudinal supporting ridge 180 at the top of the profiled section.

Each lateral profiled section has an opening in the form of a longitudinal slot, 181, 182 respectively, in its lateral face facing the central profiled section.

The top edge 183 of this opening is shaped like a channel 184 to enable a fixing piece to slide along the frame.

The bottom edge 185 is curved back on itself towards the inside so as to form a latching and hinge-articulation return 186 with a rounded transverse profile, oriented downwards.

The central recovery profiled section 120 has a profile in the form of a channel with the overall shape of a splayed U. Its longitudinal edges are bent horizontally outwards, forming a narrow flat 187 on each side, and each is then curved back on itself, being rolled inwards to form a latching/hinging return 188 similar to the one on the longitudinal profiled sections disposed opposite.

The central profiled section 120 is situated in a longitudinal median position between the two longitudinal profiled sections and slightly below them.

The removable enclosing planes 118 and 119 are disposed on each side of the central recovery profiled section 120, between the latter and each longitudinal profiled section. These planes thus form a double sloping surface collecting the liquids and debris which are carried towards a central recovery profiled section 120.

An enclosing plane in the form of a protective plate of the single type 189 forming one of said lateral plates is shown by way of example in FIGS. 35 and 36.

Each plate 189 has a rectangular format. Its width corresponds to the distance between the central profiled section 120 and each of the lateral profiled sections 176 and 177.

The protective plate is shown by way of example with a square shape.

Of course, plates of different lengths can be used for the protection.

One of the longitudinal edges 190 of the plate has a flange 191 projecting perpendicularly downwards, curving back on itself inwards along its bottom end, so as to form a latching/hinged articulation return 192, a shape which is complementary to that of the latching profiled sections 176 and 177.

The flange and its longitudinal end return 192 may be formed by a sheet attached to one of the edges of the plate. The top end of the flap is bent at right angles and immobilised against the longitudinal edge 190 of the plate by a rim backplate 193, fixed for example by means of rivets or otherwise (FIG. 36).

The opposite longitudinal edge 194 of the plate has a means of bearing and immobilisation, on one of the holding profiled sections, for example a snap-in device of the type having a bolt forming a catch 195.

The catch 195 is also fixed to the under-face of the plate by screwing or riveting, by means of a reinforcement in the form of a fixing backplate 196.

The latch 195 is shaped like a slide 197 in which moves a transverse rectangular retractable pin 198 having, at its non-operative end 199 situated towards the inside of the plate, an operating handle 200.

This pin is able to move between a retracted position in the slide and an extended position in which the operative end 201 of the pin 198 extends slightly beyond the edge of the plate.

The plate is mounted very simply by inserting the latching return 192 into the complementary longitudinal return 188 on one side of the central profiled section. The return on the plate engages with the bottom hinging/latching return on said central profiled section.

The plate can then pivot freely about this joint, forming a hinge 202.

The plate is raised until the opposite edge bearing the catch 195 is brought to the level of the opening in the shape of a longitudinal slot in the corresponding lateral profiled section, and then the moving pin of said catch is pushed.

The plate can then be released, the extended pin resting on the latching/hinging return forming the bottom edge of the longitudinal opening in the lateral profiled section.

The lateral plates can equally well be mounted in such a way that they are hinged, either on the central profiled section on both sides (FIG. 37), as described above, or on the lateral longitudinal profiled sections on both sides (FIG. 38), or else on the central profiled section on one side and on the longitudinal profiled section on the other (FIG. 39).

Figure 40:
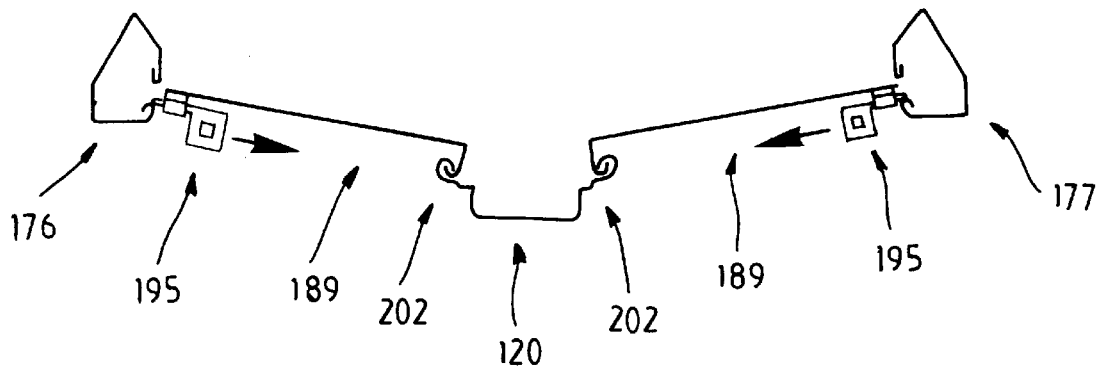
FIGS. 40, 41 and 42 are diagrammatic side views illustrating the functioning of the removable hinged plates in the simple variant mounting corresponding to FIG. 37.
Figure 41:
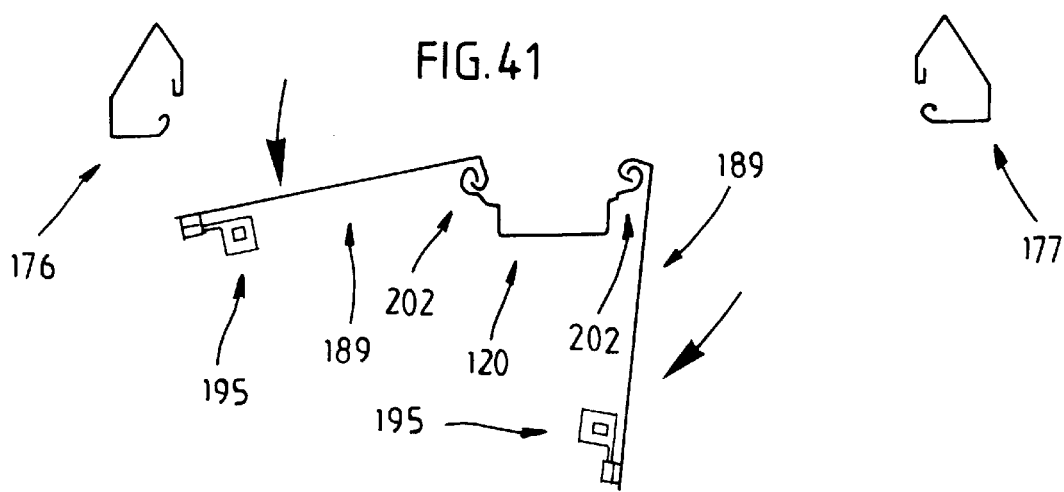
Figure 42:
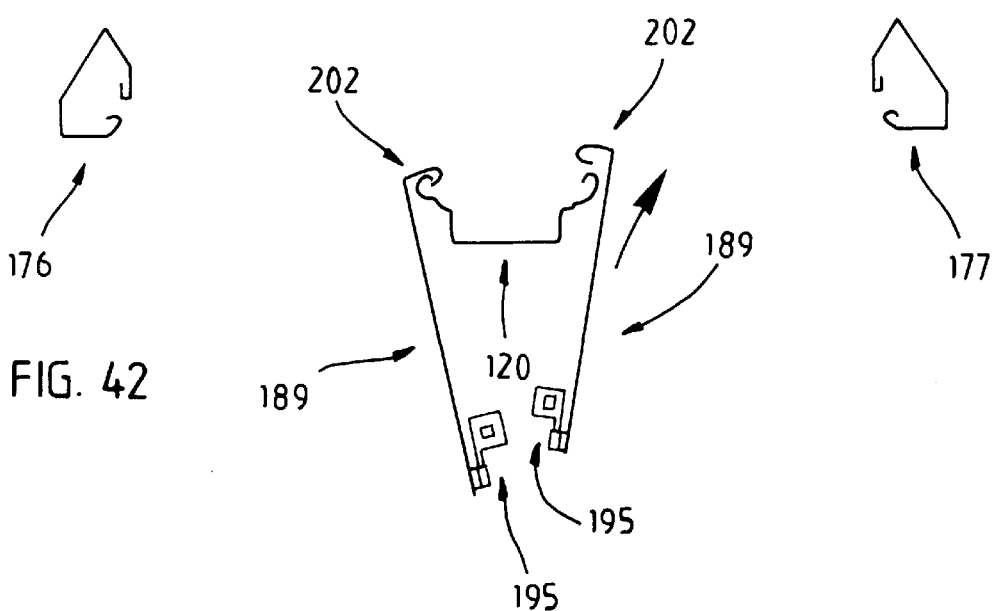

FIGS. 40, 41 and 42 illustrate the opening of the channel-shaped protection, for example for work to be carried out at any point on the transfer belt. The thickest arrows show the direction of movement.

The mounting of the plates corresponds to the variant shown in FIGS. 34 and 37.

The catches 195 are pulled and the plates 189 are lowered, pivoting about the hinge-type articulation at their rim 202.

The plates hang thus in the open state, latched onto the latching/hinging returns on the central profiled section, in a position which is practically vertical.

Each plate can then be removed very simply by shifting its latching return 192 towards the inside so as to unhook it from the complementary latching return 188 on the central profiled section.

The operations would of course be absolutely the same in the case of plates hinged on the lateral profiled sections.

Different variations in the configuration of the profiled sections of the supporting structure, as well as of the covering members, can be envisaged.

For example, the plates can be hinged on the top latching returns on the longitudinal carrier profiled sections by means of a transverse upward-projecting flap at the rim.

The catches can be replaced by any other latching means with bearing and immobilisation.

The plates can also be covered on their underside with insulating material.

The enclosure with two slopes and a central recovery profiled section can be replaced by a cover with a single slope and a single longitudinal recovery profiled section.

The recovery profiled section can be designed so as to be slightly sloping towards a discharge pipe at the lower end.

Other simple variants as well as various obvious modifications come within the scope of the present invention.

The panels 2 of the lateral surface 1 forming the lateral walls of the protective enclosure rest on the top ridge 180 of the lateral profiled sections 176 and 177.

Continuous and effective protection is thus obtained at the bottom.

Other forms of protection can also be envisaged.

As is clear from the description, the bottom carrier 6, 176, 177 and top holding 7, 126 profiles form a basic structure enabling many shapes and types of wall to be produced, with box panels or transparent plate panels, openings for checking, inspection or maintenance, noise reduction, etc.

Thus many variations in the shape of the profiled sections and the members, as well as in the profile of the walls produced, can be envisaged without departing from the scope of the invention.

It will thus be understood that the invention is not limited solely to the precise functional forms of support and locking by means of a bottom carrier profiled section and holding in a straight position by a top profiled section.

On the contrary, the protection extends to all equivalent modes of supporting and holding a panel between two holding profiled sections and two lateral-join profiled sections.

What is claimed is:

1. A protective and insulating enclosure for a conveyor type transfer unit comprising:

a lateral wall formed by a plurality of lateral panels (2), each lateral panel (2) mounted removably between a bottom longitudinal carrier profiled section (6, 176, 177) and a top longitudinal holding profiled section (7, 126) and each lateral panel being laterally separated by removable lateral-join profiled sections (3, 4, 5);

the lateral panels (2) and lateral-join profiled sections being juxtaposed and supported on the bottom longitudinal profiled section (6, 176, 177) and encased by the top longitudinal profiled section (7, 126) forming a complete lateral wall (1) adaptable to all forms of bend or path of a conveyor;

a top covering comprising at least one of a top hatch (122) and removable top panel (121), said at least one of the top hatch and removable top panel being supported at a front edge by the top longitudinal holding profiled sections (7, 126) and at a rear edge by a longitudinal encasement section (127), said at least one of the top hatch and removable top panel being further supported along at least a lateral edge by cover joining profiled sections (128, 129), the rear edge being mounted simply by encasement in a receiving and encasement cavity (134) in the longitudinal encasement section (127);

the top covering further comprising a succession of removable tunnel-shaped hoods (123, 124, 125) supported at a front and a rear edge by corresponding top longitudinal holding profiled sections (7, 126); and a bottom cover comprising a central recovery channel (120) supporting a sloping enclosure plates (118, 119, 189) along each side of the channel, the bottom cover being supported by said enclosure plates (118, 119, 189) being demountably attached along corresponding bottom longitudinal profiled sections (6, 176, 177).

2. A protective and insulating enclosure as claimed in claim 1, wherein the top longitudinal holding profiled section (7) comprises a downwardly opening linear encasement cavity (21) for insertion of both a top end of the lateral panels (2) and a top end of the lateral-join profiled section for the purpose of holding them at the top ends, the top longitudinal holding profiled section (7) further comprising a top face (20) having upwardly extending projecting linear rails (27, 28) for cooperating with the front and rear edges of the top hoods and panels.

3. A protective and insulating enclosure as claimed in claim 1, wherein the bottom longitudinal carrier profiled section (6) comprises an upwardly protruding carrier ridge (14) having on each side a flat lateral face (10, 11) for the purpose of transversely immobilizing the lateral panels (2) along a bottom edge of the lateral panel.

4. A protective and insulating enclosure as claimed in claim 2, wherein the top end of the lateral panels (2) and lateral-join profiled sections have a thickness of sufficient clearance to fit within the width of the linear encasement cavity (21) of the top longitudinal holding profiled section (7).

5. A protective and insulating enclosure as claimed in claim 3, wherein the panels (2) and lateral-join profiled sections have, along their bottom edge, a cooperating slot having a profile corresponding with that of the protruding carrier ridge (14) of the bottom longitudinal profiled section (6).

6. A protective and insulating enclosure as claimed in claim 1, wherein the lateral panels (2) are formed as a box containing an insulating and noise-reducing unit in a protective and insulating enclosure perforated on a rear face.

7. A protective and insulating enclosure as claimed in claim 1, wherein the lateral panels (2) are formed as one of an opaque and transparent plate.

8. A protective and insulating enclosure as claimed in claim 7, wherein a top and a bottom edge of the plate are fitted with a top (38) and bottom (39) adaptation profiled section and a bottom end fascia (46) the adaptations and fascia enabling the plate to cooperatively engage with the top and bottom longitudinal profiled sections.

9. A protective and insulating enclosure as claimed in claim 8, wherein the top adaptation profiled section (38) has a horizontal top face (40), two vertical flanges (41, 42) projecting downwards along the front edge and gripping the top end of the plate, and a rearwardy extending and downwardly bent leg (43) having a flat median linear bearing zone (44).

10. A protective and insulating enclosure as claimed in claim 8, wherein the bottom adaptation profiled section (39) has a longitudinal groove (45) for holding the bottom edge of the plate, a front longitudinal edge of the groove is continued downwards forming the bottom end fascia (46) and the inner longitudinal edge is continued in a flat profile (47) followed by an angled bearing slope (48) enabling it to be mounted and immobilized on the bottom longitudinal carrier profiled section (6).

11. A protective and insulating enclosure as claimed in claim 1, wherein the lateral-join profiled sections comprise a planer front face having lateral flanges partially overlapping the adjacent lateral panels, a rear face of the lateral-join profiled sections is reinforced by a tubular support structure terminating at the bottom end in an engagement projection.

12. An protective and insulating enclosure as claimed in claim 11, wherein the tubular support structure (50) comprises a rectangular cross section having a transverse thickness corresponding to that of the panels.

13. An protective and insulating enclosure as claimed in claim 11, wherein the lateral-join profiled section comprises a non-planer front face and the rear tubular support structure (57, 58) has a square cross section terminating at the bottom in one of a narrow and wide engagement projection to form one of a re-entrant and salient right angled lateral-join profiled sections respectively.

14. An protective and insulating enclosure as claimed in claim 13, wherein one of the re-entrant and salient obtuse angled lateral-join profiled sections comprises a rear tubular structure (65, 66) of a thickness corresponding to that of the lateral panels, the tubular structure terminating at the bottom end in one of a double narrow latching projection for a re-entrant angle and a single wide latching projection for a salient angle.

15. A protective and insulating enclosure as claimed in claim 11, wherein the tubular support structure (74) has a thin rectangular cross section and a thickness corresponding to that of the panels, the tubular support structure being attached to the flange and terminating at the bottom in a engagement projection (75).

16. A protective and insulating enclosure as claimed in claim 11, wherein the lateral-join profiled sections have two adjacent flanges (78) and (79)forming a right angle, one flange having a greater height than the other and projecting beyond the top end in order to define a bearing shoulder (80), the tubular rear support structure (81) of rectangular cross section terminating at the top end in a top bevel (85) and at the bottom end in a bottom engagement projection (82).

17. A protective and insulating enclosure as claimed in claim 11, wherein the front face sheet in cooperation with the tubular support structure forms an elongate gripper slot, the slot being open towards one of the front and rear of the face sheet for receiving and immobilizing a transverse plate (84).

18. A protective and insulating enclosure as claimed in claim 11, wherein at least one ofthe bottom longitudinal carrier profile section (6) and top longitudinal holding profile section (7) have a latch for securing a complementary latching member of the respective bottom cover (24) and the top cover (25).

19. A protective and insulating enclosure as claimed in claim 1, wherein the top cover (25) comprises a plurality of tunnel-shaped hoods, the hoods being one of a constant dimension(125) and slightly different dimensions enabling a telescoping slidable cooperation between a slightly smaller hood and a slightly larger hood (123, 124).

20. A protective and insulating enclosure as claimed in claim 11, wherein each top panel (121) has a front end fascia (151) projecting vertically downwards, said fascia lockably engaging a locking portion of a front face (13) of the top longitudinal profiled section (126).

21. A protective and insulating enclosure as claimed in claim 11, wherein the cover joining profiled sections (128, 129) comprise:

a flange (152, 163) supporting a tubular reinforcing and mounting structure (154, 165), the mounting structure having a top end with a thickness corresponding to the height of the receiving cavity (134) of the longitudinal encasement section (127);

a locking bearing portion (158, 167) at a front end of the tubular reinforcing structure for engagement with the top longitudinal profiled section (121);

a depending front facia (160, 164);

the joining profiled sections (128, 129) having at least one overlap flange (161, 162) projecting laterally and overlapping the lateral edge of the adjacent panel; and an end coverjoining profiled section (129) comprising an end fascia (169) depending downwards at a right angle along an edge of the flange (152).

22. A protective and insulating enclosure as claimed in claim 11, wherein the central recovery channel (120) supports the sloping enclosure plates (118, 119) at least one of which being hinged on the bottom longitudinal carrier profiled section (6, 176, 177).

23. A protective and insulating enclosure as claimed in claim 11, wherein at least on one side of said channel of the central recovery channel (120), the sloping enclosure plates (118, 119, 189) are hinged on the central recovery channel (120).

24. A protective and insulating enclosure as claimed in claim 11, wherein the enclosure plates (118, 119, 189) have, along at least a longitudinal edge (190), a transverse curved rim flange (191) forming a latching lip (192), at least one of the central recovery channel (120) and the longitudinal profiled sections (6, 176, 177) having a mating curl (186, 188) curved back in a complementary supporting shape, and the plates (118, 119, 189) are placed on at least one longitudinal carrier profiled section (6, 176, 177) by means of a support and immobilization means projecting beyond an opposite longitudinal edge (194), and the support and immobilization means is at least one catch, (195) each catch comprising a retractable pin (198) sliding between a retracted position behind the curved rim flange (191) and an extended position in which the operative end (201) of the pin (198) projects in front of the opposite longitudinal edge (194).

* * * * *

UNITED STATES PATENT AND TRADEMARK OFFICE
CERTIFICATE OF CORRECTION

PATENT NO. : 5,947,266
DATED : September 7, 1999
INVENTOR(S) : Guy RIONDE It is certified that error appears in the above-identified patent and that said Letters Patent is hereby corrected as shown below:

On the title page, insert item:

[30] Foreign Application Priority Data

November 6, 1992 [FR] France.....................92 13580

November 12, 1992 [FR] France....................92 13762

November 12, 1992 [FR] France....................92 13763

Signed and Sealed this

Eighteenth Day of April, 2000

Attest:

Q. TODD DICKINSON

Attesting Officer     Director of Patents and Trademarks